US012670235B2

(12) United States Patent
Yamamoto

(10) Patent No.: US 12,670,235 B2
(45) Date of Patent: Jun. 30, 2026

(54) CLASSIFICATION DEVICE, CLASSIFICATION METHOD, PROGRAM, AND INFORMATION RECORDING MEDIUM

(71) Applicant: RIKEN, Wako (JP)

(72) Inventor: Yoichiro Yamamoto, Wako (JP)

(73) Assignee: RIKEN, Wako (JP)

( * ) Notice: Subject to any disclaimer, the term of this patent is extended or adjusted under 35 U.S.C. 154(b) by 1497 days.

(21) Appl. No.: 17/279,490

(22) PCT Filed: Jul. 25, 2019

(86) PCT No.: PCT/JP2019/029193
§ 371 (c)(1),
(2) Date: Mar. 24, 2021

(87) PCT Pub. No.: WO2020/066257
PCT Pub. Date: Apr. 2, 2020

(65) Prior Publication Data
US 2022/0036140 A1 Feb. 3, 2022

(30) Foreign Application Priority Data
Sep. 26, 2018 (JP) ................................. 2018-181008

(51) Int. Cl.
*G06F 18/2411* (2023.01)
*G06F 18/21* (2023.01)
(Continued)

(52) U.S. Cl.
CPC ...... *G06F 18/2411* (2023.01); *G06F 18/2163* (2023.01); *G06F 18/23* (2023.01); *G06F 18/2431* (2023.01); *G06N 20/20* (2019.01)

(58) Field of Classification Search
CPC .. G06F 18/2411; G06F 18/2163; G06F 18/23; G06F 18/2431; G06F 16/55;
(Continued)

(56) References Cited

U.S. PATENT DOCUMENTS 5,606,653 A * 2/1997 Gilmore, Jr. .......... G06T 11/203
345/440
8,805,752 B2 * 8/2014 Kawahara ........... G06F 18/2411
706/12
(Continued)

FOREIGN PATENT DOCUMENTS

CN 106030608 A 10/2016
CN 106127255 A 11/2016
(Continued)

OTHER PUBLICATIONS

Okamoto, T., et al., "Image Segmentation of Pyramid Style Indentifier based on Support Vector Machine for Colorectal Endoscopic Images", IEEE, 37th Annual International Conference, Nov. 5, 2015, 6 pgs.

(Continued)

*Primary Examiner* — Imad Kassim
(74) *Attorney, Agent, or Firm* — Ohlandt, Greeley and Perle, L.L.P.

(57) ABSTRACT

Provided is a classification device to classify an image by identifying, on a photograph on which a target belonging to one of a plurality of groups is captured, a portion that characterizes a single group. An acquirer acquires learning images obtained by dividing a learning photograph, the acquirer associating the learning images with a group to which a learning target captured on the learning photograph belongs; a first learner learns a first model for applying dimensionality reduction to the learning images, classifying them, and calculating score vectors; an associator calculates a representative degree vector that represents the degree to which each class represents each group and associates each class with a group, based on the calculated representative degree vectors; a receiver receives determination images obtained by dividing a determination photograph; and an identifier classifies each determination image to one of the (Continued)

classes, using the first model, and identifies the group associated with the class into which the image is classified.

21 Claims, 25 Drawing Sheets

(51) Int. Cl.

| | |
|---|---|
| *G06F 18/23* | (2023.01) |
| *G06F 18/2431* | (2023.01) |
| *G06N 20/20* | (2019.01) |

(58) Field of Classification Search
CPC .... G06N 20/20; G06V 2201/03; G06V 10/26; G06V 10/774; G06V 10/82; G06T 2207/20021; G06T 2207/20081; G06T 2207/20084; G06T 2207/30024; G06T 7/0012

See application file for complete search history.

(56) References Cited

U.S. PATENT DOCUMENTS

| | | | | |
|---|---|---|---|---|
| 9,519,966 | B2 * | 12/2016 | Ghouti | G06V 10/255 |
| 11,017,255 | B2 * | 5/2021 | Lee | G06N 3/04 |
| 11,835,524 | B2 * | 12/2023 | Agus | G16H 20/10 |
| 2016/0314579 | A1 * | 10/2016 | Ghouti | G06V 10/764 |
| 2016/0350912 | A1 * | 12/2016 | Koide | G02B 23/2484 |
| 2017/0069094 | A1 * | 3/2017 | Kim | G06V 10/764 |
| 2019/0197359 | A1 * | 6/2019 | Haneda | G06N 3/0464 |
| 2021/0073595 | A1 | 3/2021 | Yamamoto | |

FOREIGN PATENT DOCUMENTS

| | | |
|---|---|---|
| EP | 2270719 A1 | 1/2011 |
| JP | 2015-146970 | 8/2015 |
| JP | 6345332 | 6/2018 |
| JP | 6856950 | 4/2021 |
| WO | 2015-056436 | 4/2015 |
| WO | 2021-015016 | 1/2021 |

OTHER PUBLICATIONS

Sugi, K., et al., "High Performance Feature Transformation Architecture based on Bag-of-Features in CAD system for Colorectal Endoscopic Images", SASIMI 2015 Proceedings, 12 pgs.

Sugi, K., et al., "Architecture of Bottom-up Feature Construction for Robust Computer-Aided Diagnosis System", IEICE Technical Report, Nov. 24, 2015, vol. 115, No. 343, 10 pgs. (English abstract).

International Search Report dated Oct. 15, 2019 in corresponding International PCT Patent Application PCT/JP2019/029193, 4 pgs.

Extended European Search Report dated Jun. 1, 2022 for European Appl. No. 19867605.8.

Yamamoto Yoichiro et al: "Automated acquisition of explainable knowledge from unannotated histopathology images"; Nature Communications, [Online], vol. 10, No. 1; Dec. 18, 2019 (Dec. 18, 2019); pp. 1-9.

Yoshihiro Yamada et al., "Consideration of additional task for improving image classification accuracy", IEICE Technical Report, vol. 118, No. 512, The Institute of Electronics, Information and Communication Engineers, Mar. 10, 2019, pp. 155-160, ISSN: 0913-5685 (English comments of the Japanese Examiner addressing this related art).

Japanese Office Action dated Jul. 20, 2021 in corresponding Japanese counterpart patent application No. 2020-548058, 15 pgs.

Extended European Search Report dated May 24, 2022 for European Appl. No. 19867605.

Chinese Office Action dated Dec. 28, 2024 for Chinese Application No. 201980063201.7.

* cited by examiner

CLASSIFICATION DEVICE, CLASSIFICATION METHOD, PROGRAM, AND INFORMATION RECORDING MEDIUM

TECHNICAL FIELD

The present disclosure relates to a classification device, a classification method, a program, and a non-transitory information recording medium to classify an image by identifying, on a photograph on which a target belonging to one of a plurality of groups is captured, a portion that characterizes a single group.

BACKGROUND ART

Conventionally, a technique has been proposed for classifying photographs that capture a target, using a neural network, to use the photographs for diagnosis and the like.

Patent Literature 1, for example, discloses a technique of receiving a target image that captures a target and at least one attribute parameter associated with the target; and convolving individual elements of a provided feature map and the at least one received attribute parameter when classifying the target using a neural network.

Even when photographs are taken of patients who have a lesion or the like, regions that have the same outer appearance as those of healthy individuals are often captured on the photographs. This happens, for example, when some of the cells are affected by the lesion but many cells remain normal.

Conventionally, in the prognostication for predicting recurrence of a prostate cancer and the like, it is a common practice that the doctor narrows down the regions to those with a cancer (regions with a lesion) as opposed to the other regions (normal regions) and circumscribes the regions on a pathology photograph on which the target site of the subject is captured, based on the medical knowledge. For example, under the Gleason grading system, which is widely used for classifying cancers according to malignancy, it is necessary to measure the malignancy by narrowing down the cancer regions and further examining the tissue structure of the cancer.

This technique is problematic in that the narrowing down and circumscribing of the regions takes a huge amount of work and a long time, that the accuracy differs from one doctor to another, and that only the outward appearance identifiable based on the conventional medical knowledge can be analyzed.

CITATION LIST

Patent Literature

Patent Literature 1: Japanese Patent No. 6345332

SUMMARY OF INVENTION

Technical Problem

Therefore, a technique is desired for accurately and automatically extracting, from a photograph on which a target (for example, a "person" who is the target of diagnosis) is captured, the regions that characterize the targets belonging to a particular group (for example, a group of "persons who will have a cancer recurrence") and thereby determining whether or not the target belongs to the particular group as well as finding a new recurrence factor not recognized in the existing medical knowledge.

In other words, it is desired that targets will be accurately classified into groups by discerning the region that serves as an important factor for characterizing each group and that the knowledge about the difference among groups will be understood by humans.

In order to extract such a region, it is necessary to identify whether each of the images obtained by dividing the photograph into small sections is characteristic of one particular group or is commonly observed in other groups.

To address the above-described problem, an objective of the present disclosure is to provide a classification device, a classification method, a program, and a non-transitory information recording medium to classify an image by identifying, on a photograph on which a target belonging to one of a plurality of groups is captured, a portion that characterizes a single group.

Solution to Problem

A classification device according to the present disclosure acquires a plurality of learning images $S_{i,1}$, $S_{i,2}$, . . . , which are obtained by dividing each learning photograph $S_i$ of a plurality of learning photographs $S_1$, $S_2$, . . . , associating the plurality of learning images with a group $G_{z(i)}$ to which a learning target captured on each learning photograph $S_i$ belongs among a plurality of groups $G_1$, $G_2$, . . . , $G_L$;

learns a first model for calculating a plurality of compressed vectors $v_{1,1}$, $v_{1,2}$, . . . , $v_{2,1}$, $v_{2,2}$, . . . ,

. . . , obtained by dimensionality reduction from the plurality of acquired learning images $S_{1,1}$, $S_{1,2}$, . . . , $S_{2,1}$, $S_{2,2}$, . . . ,

. . . , a class $C_{y(i,j)}$ among a plurality of classes $C_1$, $C_2$, . . . , $C_M$, wherein each learning image $S_{i,j}$ of the plurality of learning images and each compressed vector $v_{i,j}$ of the plurality of compressed vectors are classified into the class $C_{y(i,j)}$, and a plurality of M-dimensional score vectors $u_{i,j}$, which represent a nearness of each compressed vector $v_{i,j}$ to each of the plurality of classes;

calculates an M-dimensional representative degree vector $r_h$ that represents the degree to which each of the plurality of classes $C_1$, $C_2$, . . . , $C_M$ represents each group $G_h$ of the plurality of groups $G_1$, $G_2$, . . . , $G_L$ from one or more score vectors $u_{i,j|z(i)=h}$ calculated for one or more compressed vectors $v_{i,j|z(i)=h}$ associated with each group $G_h$, and associates each class $C_k$ of the plurality of classes with a group $G_{x(k)}$ from among the plurality of groups $G_1$, $G_2$, . . . , $G_L$ and another group $G_0$ based on the calculated representative degree vectors $r_1$, $r_2$, . . . , $r_L$;

receives a plurality of determination images obtained by dividing a determination photograph on which a determination target is captured; and classifies each of the received plurality of determination images to one of the plurality of classes, using the learned first model, and identifies the group associated with the class into which the image is classified.

Further, the classification device may learn a second model with which the learning target captured on each learning photograph $S_i$ is assigned to one of the plurality of groups $G_1, G_2, \ldots, G_L$, based on a distribution of groups $G_{x(y(i,1))}, G_{x(y(i,2))}, \ldots$, which are associated with classes $C_{y(i,1)}, C_{y(i,2)}, \ldots$ into which compressed vectors $v_{i,1}, v_{1,2}, \ldots$ are classified; and infer to which group among the plurality of groups $G_1, G_2, \ldots, G_L$ the determination target belongs, using the learned second model, based on a distribution of the groups identified for the determination target.

Advantageous Effects of Invention

According to the present disclosure, it is possible to provide a classification device, a classification method, a program, and a non-transitory information recording medium to classify an image by identifying, on a photograph on which a target belonging to one of a plurality of groups is captured, a portion that characterizes a single group.

DESCRIPTION OF EMBODIMENTS

Figure 1:
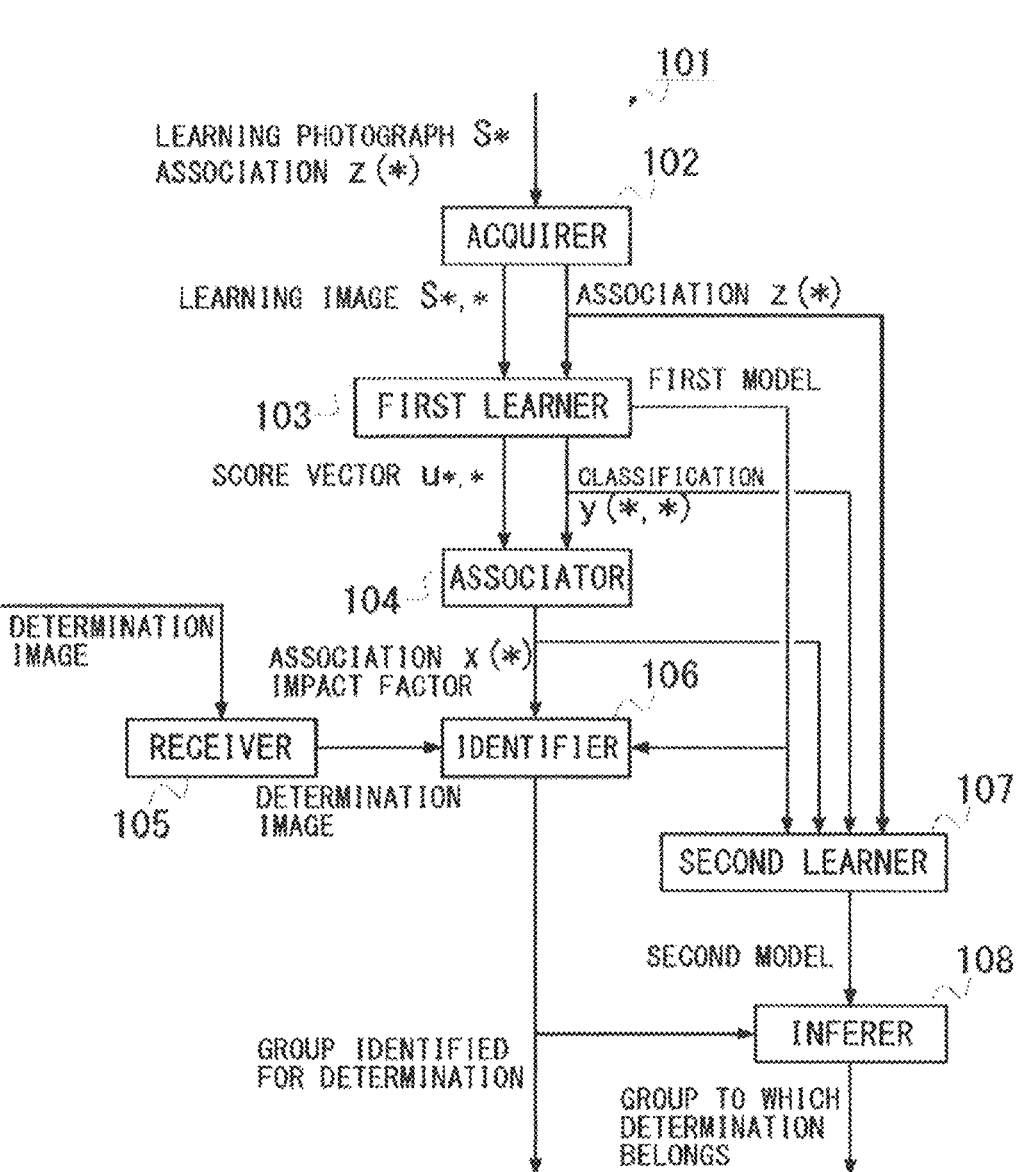
FIG. 1 is an explanatory diagram illustrating a schematic configuration of a classification device (Stage 1) according to an embodiment of the present disclosure.

Embodiments of the present disclosure will be described below. These embodiments are provided for explanation purposes only and do not limit the scope of the present disclosure. Those skilled in the art can replace some or all of the components of the embodiments with equivalents thereof to configure other embodiments. Some of the components of the embodiments described below may be appropriately omitted depending on the usage. That is, any embodiment in accordance with the principle of the disclosure is encompassed in the scope of the present disclosure.

Configuration

A classification device according to the present embodiment is typically achieved by execution of a program by a computer. This computer is connected to various output devices and input devices and transmits and receives information to and from these devices.

The program executed by the computer may be distributed and sold via a server communicably connected to the computer. Alternatively, the program may be stored on a non-transitory information recording medium, such as a compact disk read only memory (CD-ROM), a flash memory, or an electrically erasable programmable ROM (EEPROM), and this non-transitory information recording medium may be distributed and sold, for example.

The program is installed in a non-transitory information recording medium, such as a hard disk, a solid state drive, a flash memory, or an EEPROM, included in a computer. This computer can achieve an information processing system according to the present embodiment. In general, the CPU of the computer loads the program from the non-transitory information recording medium into a random access memory (RAM) and interprets and executes the codes contained in the program, under the management of the operating system (OS) of the computer. It should be noted that explicit loading of the program into the RAM may be unnecessary in an architecture in which the non-transitory information recording medium can be mapped in a memory space accessible by the CPU. The RAM can temporarily store various types of data required in the process of execution of the program.

The computer is equipped with a GPU as described above, which should preferably contribute to rapid operations of various image processing. The computer uses the GPU and libraries, such as TensorFlow, and thereby performs the learning and classifying functions in various AI calculations, under the control of the CPU.

The information processing system according to the present embodiment may be configured by a dedicated electronic circuit instead of a general-purpose computer. In this case, the program may also serve as a material for generating an electronic circuit diagram or a timing chart. The electronic circuit that satisfies the specification defined in the program is composed of a field programmable gate array (FPGA) or an application specific integrated circuit (ASIC) in this case. This electronic circuit functions as a dedicated device performing the functions defined in the program and thus configures the information processing system according to the present embodiment.

The following description assumes that the classification device 101 is achieved by execution of a program by a computer, in order to facilitate the reader's understanding. FIG. 1 is an explanatory diagram illustrating a schematic configuration of a classification device (Stage 1) according to an embodiment of the present disclosure.

As illustrated in the drawing, the classification device 101 according to the present embodiment includes an acquirer 102, a first learner 103, an associator 104, a receiver 105, and an identifier 106. A second learner 107 and an inferrer 108 may also be included as omissible components. As described above, these components can be achieved by a computer executing a program or by an electronic circuit built according to the specification defined in the program. The functions of the components will be described below.

Learning Photographs, Learning Images, and Groups

First, the acquirer 102 acquires a plurality of learning images $S_{i,1}$, $S_{i,2}$, . . . , which are obtained by dividing each learning photograph $S_i$ of a plurality of learning photographs $S_1$, $S_2$, . . . , the acquirer 102 associating the plurality of learning images with a group $G_{z(i)}$ to which a learning target captured on each learning photograph $S_i$ belongs among a plurality of groups $G_1$, $G_2$, . . . , $G_L$. The asterisks (*) in the drawings denote that the subscript, argument, and the like take integer values such as 1, 2, . . . .

To the acquirer 102 is given as input an association z(i) for identifying the group to which belongs the learning target captured on the i-th learning photograph $S_i$ of the learning photographs $S_1$, $S_2$, . . . . The association z(i) is expressed here as a function but the association may be inputted to the acquirer 102 in various forms such as array, associative array, hash, and the like.

Thus, the acquirer 102 performs association by:

(1) acquiring the learning images $S_{1,1}$, $S_{1,2}$ . . . , which are obtained by dividing the learning photograph $S_i$, these learning images associated with the group $G_{z(1)}$, (2) acquiring the learning images $S_{2,1}$, $S_{2,2}$ . . . , which are obtained by dividing the learning photograph $S_2$, these learning images associated with the group $G_{z(2)}$, . . . , (i) acquiring the learning images $S_{i,1}$, $S_{i,2}$, . . . , obtained by dividing the learning photograph $S_i$, these learning images associated with the group $G_{z(i)}$, . . . .

The learning photographs $S_1$, $S_2$, . . . $S_i$, . . . may be given to the acquirer 102, and (as illustrated in the drawing) the acquirer 102 may then appropriately divide these learning photographs to obtain a plurality of learning images:

$S_{1,1}$, $S_{1,2}$, . . . , $S_{2,1}$, $S_{2,2}$ . . . ,

. . . , $S_{i,1}$, $S_{i,2}$, . . . ,

. . . .

The learning photographs may be divided into a plurality of learning images in a process prior to the classification device 101 and the resulting plurality of learning images may be inputted to the acquirer 102.

In addition, when the learning photographs are super high definition photographs, the definition of each learning photograph may be lowered when dividing the learning photograph to obtain learning images. This is appropriate for speeding up the learning using artificial intelligence.

The groups may be arranged, for example, in such a way that L=2, the first group are healthy individuals, the second group are affected individuals, and the learning photographs are various pathology photographs, such as photomicrographs that have captured tissue samples collected from the organ that is the learning target and roentgenograms that have capture the target organ.

In the above-described example, there are one or more learning photographs for each learning target. In the present embodiment, each learning photograph is divided into a plurality of learning images, and each learning image is associated with the same group to which belongs the learning target captured on the learning photograph from which the learning image originates, in order to automatically extract from the learning photograph the regions to which the attention of the diagnosing doctor should be drawn.

Thus, there are multiple learning images for each learning target. Further, there may be a learning image of an affected individual indistinguishable from one of a healthy individual (in a case, for example, in which an image of a region where cells that look normal may be captured even when the individual is affected and the like).

When the learning photographs are divided, adjustment can be made to have all the learning images in the same size. Based on the distribution of pixel values on the learning images, character recognition, noise recognition, and the like, it is possible to remove the background portions and border portions only partially capturing the target as well as the portions depicting information other than the target such as, for example, the time and date of the photograph, the patient number, and the like, and these portions may be excluded from the learning images. Without removal processing, however, most of these backgrounds, borders, and character information can be automatically removed by the processing to be described later as these backgrounds, borders, and character information appear both on the photographs of healthy individuals and those of affected individuals.

First Model

The first learner 103 learns a first model. With the first model, three types of information are obtained:

(a) a plurality of compressed vectors $v_{1,1}, v_{1,2}, \ldots,$ $v_{2,1}, v_{2,2}, \ldots,$ $\ldots,$ $v_{i,1}, v_{i,2}, \ldots,$ obtained by dimensionality reduction from the plurality of acquired learning images $S_{1,1}, S_{1,2}, \ldots,$ $S_{2,1}, S_{2,2}, \ldots,$ $\ldots,$ $S_{i,1}, S_{i,2}, \ldots,$ $\ldots,$ (b) a class $C_{y(i,j)}$ among a plurality of classes $C_1$, $C_2, \ldots, C_M$, wherein each learning image $S_{i,j}$ of the plurality of learning images and each compressed vector $v_{i,j}$ of the plurality of compressed vectors are classified into the class $C_{y(i,j)}$, and (c) a plurality of M-dimensional score vectors $u_{i,j}$, which represent a nearness of each compressed vector $v_{i,j}$ to each of the plurality of classes.

Dimensionality Reduction

An autoencoder can be used to obtain compressed vectors from the learning images by dimensionality reduction. As the autoencoder, a convolutional autoencoder, sparse autoencoder, deep autoencoder, denoising autoencoder, contractive autoencoder, saturating autoencoder, nonparametrically guided autoencoder, or a combination thereof may be used.

Figure 2A:
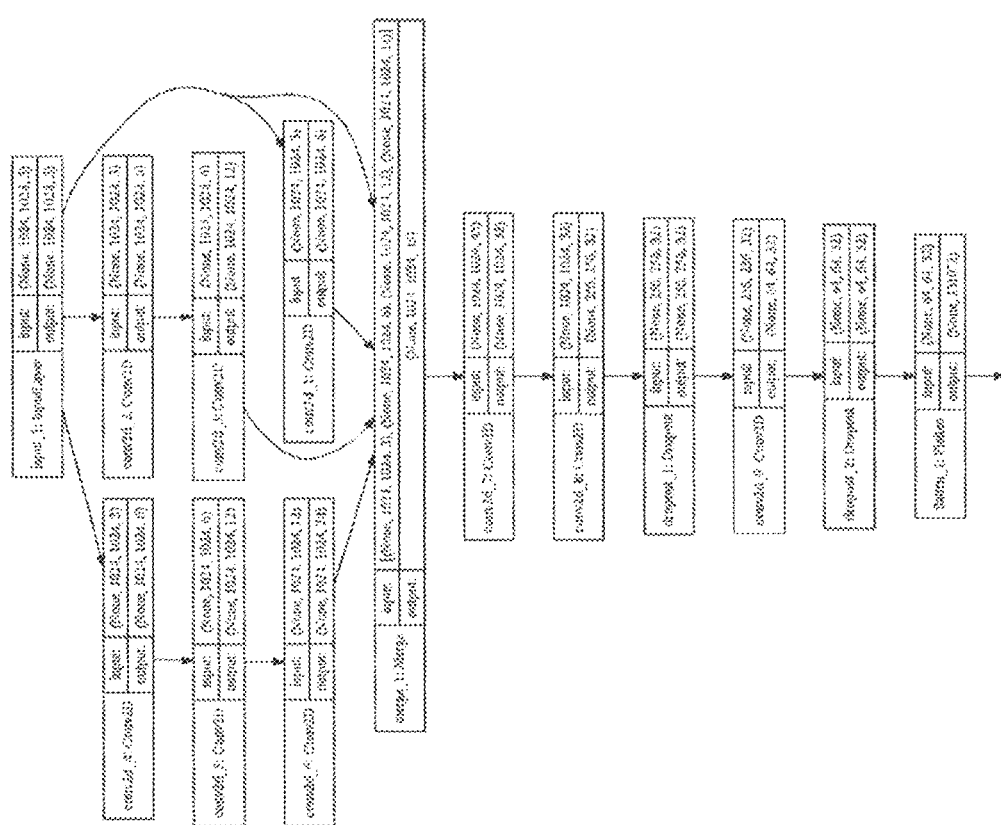
FIG. 2A is an explanatory diagram illustrating the first part of an example filter configuration of deep learning utilizable for learning a first model.
Figure 2B:
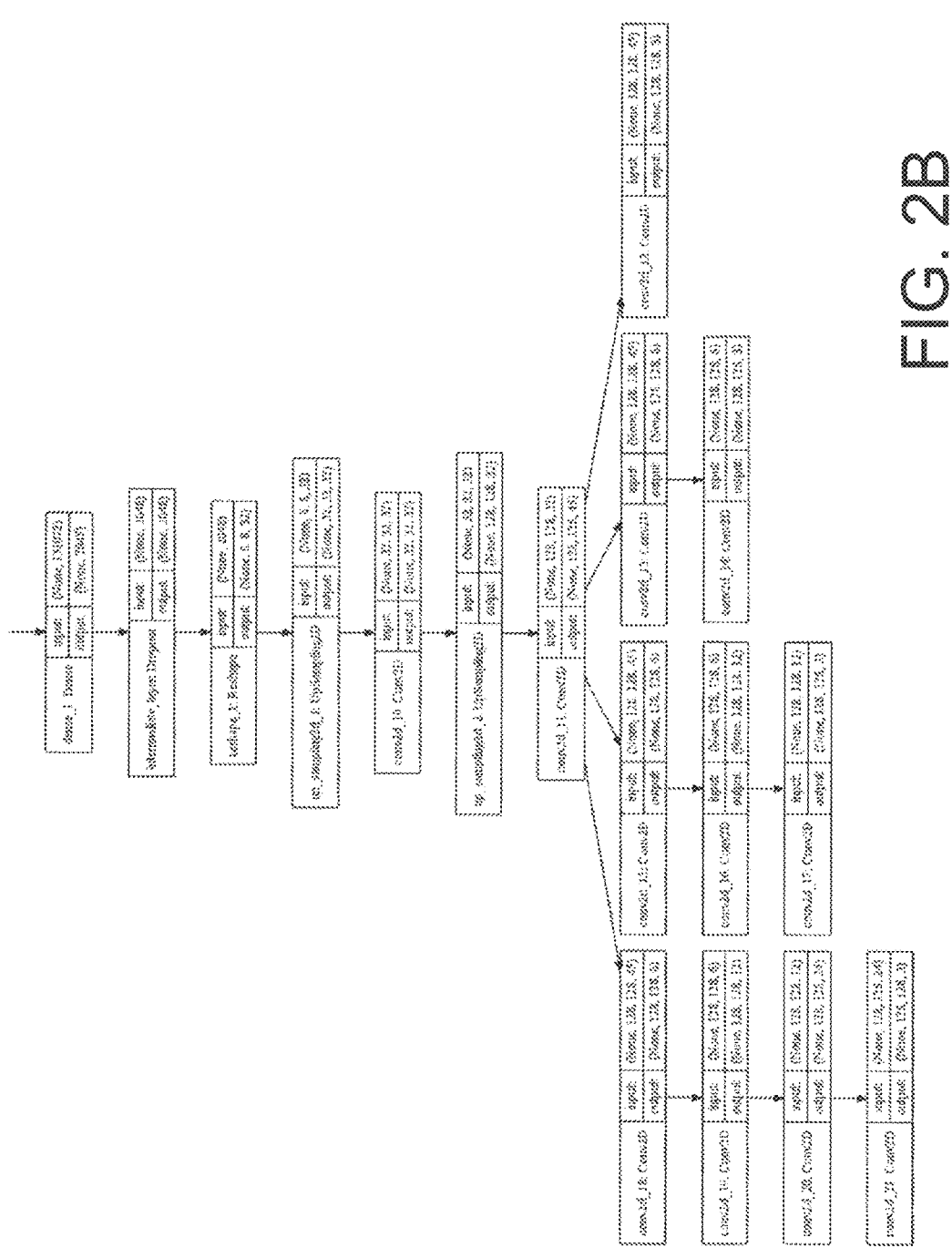
FIG. 2B is an explanatory diagram illustrating the second part of an example filter configuration of deep learning utilizable for learning the first model.

FIG. 2A is an explanatory diagram illustrating the first part of an example filter configuration of deep learning utilizable for learning a first model. FIG. 2B is an explanatory diagram illustrating the second part of an example filter configuration of deep learning utilizable for learning the first model. Various neural networks other than those illustrated in these drawings may be applied for the learning of the first model.

Dimensionality reduction is a transformation of a vector having all pixel values of a learning image as components thereof into a vector representing the features of the outward appearance of the learning image with a lower dimensionality. As described above, techniques for extracting the features representing an image have been achieved in image processing and artificial intelligence processing such as machine learning and deep learning.

Thus, not only autoencoders but these various techniques can be employed for dimensionality reduction.

In a simplest embodiment, no backpropagation is performed in the first model but only the process of automatically classifying the features of the large number of inputted learning images to dimensionality reduction is performed. By performing the inference to be described below, however, parameters and the like for the autoencoder and the like can be learned so as to increase the accuracy of classification to the groups by performing backpropagation.

Classes

Techniques for classifying compressed vectors into classes include a classification technique based on the position of the maximum component of each compressed vector and a technique based on clustering. Each class may represent a feature that appears only in one group or may represent a feature that appears commonly in a plurality of groups.

Thus it is preferable to appropriately adjust the number M of the classes according to the number L of the groups, the total number and size of the learning photographs, and the total number and size of the learning images.

For example, when there are L groups and, for each of the groups, at least one class that represents a feature for the group is to be found, the number M of the classes needs to be equal to or greater than L and M can be several times or several tens of times as great a number as L. On the other hand, when it is not necessary to find a feature for all the groups, the number M of the classes can be smaller.

When the compressed vector is an M-dimensional vector, the compressed vector $v_{i,j}$ can be classified into the class $C_k$ ($=C_{y(i,j)}$) by simply using the index k for the maximum component of the compressed vector $v_{i,j}$ (the k-th component is the maximum component) and stipulating $y(i,j)=k$. According to this technique, the compressed vectors are classified into M classes since the compressed vector is M-dimensional.

Herein, $y(i,j)$ is an expression, in the form of a function, that the learning image $S_{i,j}$ and the compressed vector $v_{i,j}$ is classified in to the class $C_{y(i,j)}$. Similarly to the association $z(i)$, the classification $y(i,j)$ can be implemented in various forms such as array, associative array, hash, and the like.

On the other hand, when the dimensionality of the compressed vectors is sufficiently greater than M (when the dimensionality is in a sufficiently great order, for example, 100 times or more), the classification $y(i,j)$ can be obtained by applying clustering to the compressed vectors.

For clustering, K-means, K-means++, affinity propagation, mean-shift, spectral clustering, Ward hierarchical clustering, agglomerative clustering, DBSCAN, Gaussian mixtures, BIRCH, principal component analysis, or a combination thereof can be used. In the case of X-means or the like, where the number of classes for classification is automatically adjusted, the number M of the classes can be automatically adjusted by restricting the lower limit of the number of the classes for classification in a manner depending on the number L of the groups.

By this classification, learning images of which the outward appearances have some common features are classified into the same class. According to the experiments by the inventor, some of the features of the outward appearance correspond to those that doctors have empirically learned through conventional diagnostic techniques while others have been found for the first time according to the present disclosure, as will be described below.

The learning images depicting backgrounds, borders, characters, and the like of the photographs are expected to be classified collectively to a class representing backgrounds, a class representing borders, a class representing characters and character strings, respectively. Thus, backgrounds, borders, and characters need not be removed in a prior process as backgrounds, borders, and characters can be easily left out by disregarding these classes in the processing to be described below.

Score Vector

A score vector $u_{i,j}$ is a vector representing how similar, approximate, or proximate a learning image $S_{i,j}$ and a compressed vector $v_{i,j}$ are to each of the classes $C_1$, $C_2, \ldots, C_M$. Thus, a score vector $u_{i,j}$ is an M-dimensional vector. In the following, the k-th component of a score vector $u_{i,j}$ will be written as $u_{i,j,k}$. The component $u_{i,j,k}$ of a score vector represents how similar, approximate, or proximate a learning image $S_{i,j}$ and a compressed vector $v_{i,j}$ are to the class $C_k$.

The simplest score vector is a vector of which the component $u_{i,j,y(i,j)}$, which is the component corresponding to the class $C_{y(i,j)}$, is 1 and the other components $u_{i,j,k|y(i,j)\neq k}$ are 0. This is a unit vector of which the y(i,j)-th component is 1 and the other components are 0. The class into which the learning image $S_{i,j}$ and the compressed vector $v_{i,j}$ are classified is expressed by the index of the component having a value of 1.

The next simplest score vector is a vector of which the component corresponding to each class $C_k$ is the proximity of the compressed vector $v_{i,j}$ to the representative point of the class $C_k$. In other words, the k-th component is to be the proximity, which is defined by the distance $d_{i,j,k}$ between the representative point (centroid of the cluster) of the class $C_k$ and the compressed vector $v_{i,j}$.

The distance $d_{i,j,k}$ may simply be a Euclidean distance or may be the distance from the representative point, normalized in the direction of each axis, based on the variance-covariance matrix of the multidimensional distribution of the compressed vector $v_{i,j|y(i,j)=k}$ classified into the class $C_k$.

The proximity may be, for example, the reciprocal of the distance $d_{i,j,k}$, in other words, $u_{i,j,k} 1/d_{i,j,k}$, the reciprocal of the sum of the distance $d_{i,j,k}$ and a positive constant $\alpha$, in other words, $u_{i,j,k} 1/(d_{i,j,k}+\alpha)$, the ordinal number that indicates the position of the distance $d_{i,j,k}$ among distances $d_{i,j,1}, d_{i,j,2} \ldots, d_{i,j,M}$ in terms of magnitude (the smaller the distance $d_{i,j,k}$, the greater the ordinal number thereof), a parameter that monotonically increases according to the above-described ordinal number, for example, giving 10 to the smallest distance $d_{i,j,k}$ among the distances $d_{i,j,1}, d_{i,j,2}, \ldots, d_{i,j,M}$ to the next smallest distance, 2 to the third smallest distance, and 0 to all the rest, and the like.

Further, when the compressed vector is an M-dimensional vector, the score vector $u_{i,j}$ may be obtained by applying softmax to the compressed vector $v_{i,j}$. In other words, the k-th component of the score vector $u_{i,j}$ is calculated, using the exponential function exp( ) as:

$$\exp(d_{i,j,k})/\Sigma_{k=1}^{M} \exp(d_{i,j,k}).$$

Softmax may be applied at the last part of the autoencoder. In this case, the compressed vector $v_{i,j}$ as is can be used as the score vector $u_{i,j}$.

Representative Degree Vector

The associator 104 calculates an M-dimensional representative degree vector $r_h$ that represents the degree to which each of the plurality of classes $C_1, C_2, \ldots, C_M$ represents each group $G_h$ of the plurality of groups $G_1, G_2, \ldots, G_L$, from the score vector $u_{i,j|z(i)=h}$, which is calculated for the compressed vector $v_{i,j|z(i)=h}$ associated with each group $G_h$.

The representative degree vector $r_h$ represents the degree to which the plurality of classes $C_1, C_2, \ldots, C_M$ represent the group $G_h$ and can be the summation of score vectors calculated for the learning images and the compressed vectors associated with the group $G_h$, in other words, the summation of the score vectors $u_{i,j}$, where the index i,j satisfies z(i)=h. In other words, $$r_h = /\Sigma_{i,j|z(i)=h} u_{i,j}$$

and the k-th component $r_{h,k}$ of the representative degree vector $r_h$ represents the degree to which the class $C_k$ represents the group $G_h$.

Association of Classes with Groups

The associator 104 then associates each class $C_k$ with the group $G_{x(k)}$ from among the plurality of groups $G_1, G_2, \ldots, G_L$, and another group $G_0$ based on the calculated representative degree vectors $r_1, r_2, \ldots, r_L$.

In particular, for each class $C_k$ of the plurality of classes $C_1, C_2, \ldots, C_M$, the associator 104 acquires k-th components $r_{1,k}, r_{2,k}, \ldots, r_{L,k}$ respectively of the representative degree vectors $r_1, r_2, \ldots, r_L$ and associates the class $C_k$ either with the group $G_h$ or with the group $G_0$ by stipulating $$x(k)=h$$

when the maximum value $r_{h,k}$ among these components is an outlier to the distribution of the components $r_{1,k}, r_{2,k}, \ldots, r_{L,k}$ other than the maximum value $r_{h,k}$, and otherwise stipulating $$x(k)=0.$$

Herein, that the maximum value $r_{h,k}$ is an outlier to the other components $r_{1,k}, r_{2,k}, \ldots, r_{h-1,k}, r_{h+1,k}, \ldots, r_{L,k}$, in other words, the maximum value $r_{h,k}$ is distinctly greater means that the class $C_k$ can be used for discriminating the group $G_h$ from the other groups $G_1, G_2, \ldots, G_{h-1}, G_{h+1}, \ldots, G_L$. In other words, the learning images classified into the class $C_k$ have a common feature in outward appearance that characterizes the group $G_h$ but is rarely observed in the other groups.

The simplest technique to employ is to regard the maximum value $r_{h,k}$ is an outlier when the maximum value $r_{h,k}$ exceeds a threshold value, which is set by multiplying the summation of $r_{1,k}, r_{2,k}, \ldots, r_{L,k}$ by a constant not smaller than 0.5 and not greater than 1. The constant not smaller than 0.5 and not greater than 1 may be set in advance or may be set by the user of the classification device 101, whichi makes an appropriate adjustment. In the present case, a majority is regarded as being distinctly greater.

Further, the maximum value $r_{h,k}$ may be regarded as an outlier when $r_{h,k}$ exceeds a threshold value set at a desired level of significance from the distribution of the other components.

For example, a simple outlier test is possible by calculating the average $\mu$ and the standard deviation $\sigma$ and setting the threshold value at $\mu+2\sigma$ or $\mu+3\sigma$.

Further, various outlier tests can be employed for determining whether or not the maximum value $r_{h,k}$ is an outlier, such as Smirnov-Grubbs test and Thompson test.

By test-based techniques, the maximum value $r_{h,k}$ can be determined to be an outlier even when the maximum value $r_{h,k}$ is not a majority.

Determination Images

By the above-described processing, the first model for classifying images into classes is learned and the classes of images are associated with the groups.

The receiver 105 of the classification device 101 then receives a plurality of determination images obtained by dividing a determination photograph on which a determination target is captured. The receiver 105 may receive one determination photograph or a plurality of determination photographs.

The identifier 106 classifies each of the received plurality of determination images to one of the plurality of classes, using the learned first model, and identifies the group associated with the class into which the image is classified.

Thus, among the plurality of determination images, a determination image presenting an outward appearance characteristic to the group $G_1$ is classified into a class $C_{k|x(k)=1}$ associated with the group $G_1$, a determination image presenting an outward appearance characteristic to the group $G_2$ is classified into a class $C_{k|x(k)=2}$ associated with the group $G_2$, . . . , a determination image presenting an outward appearance characteristic to the group $G_h$ is classified into a class $C_{k|x(k)=h}$ associated with the group $G_h$, . . . , and a determination image presenting an outward appearance characteristic to the group $G_L$ is classified into a $C_{k|x(k)=L}$ associated with the group $G_L$.

In contrast, a determination image that presents an outward appearance that appears commonly in a plurality of groups and a determination image that depicts a background, a border, or a character is classified into a class $C_{k|x(k)=0}$ associated with the group $G_0$.

Thus, when displaying a determination photograph, by highlighting the regions of the determination image that are identified with a group among the groups $G_1, G_2, . . . , G_L$ on the determination photograph, on a screen in such a manner that the regions are associated with each group, the regions worthy of attention can be conspicuously displayed to the doctor or the technician who makes a diagnosis or a decision when the doctor or the technician determines the group to which the determination target captured on the determination photograph belongs.

Figure 3A:
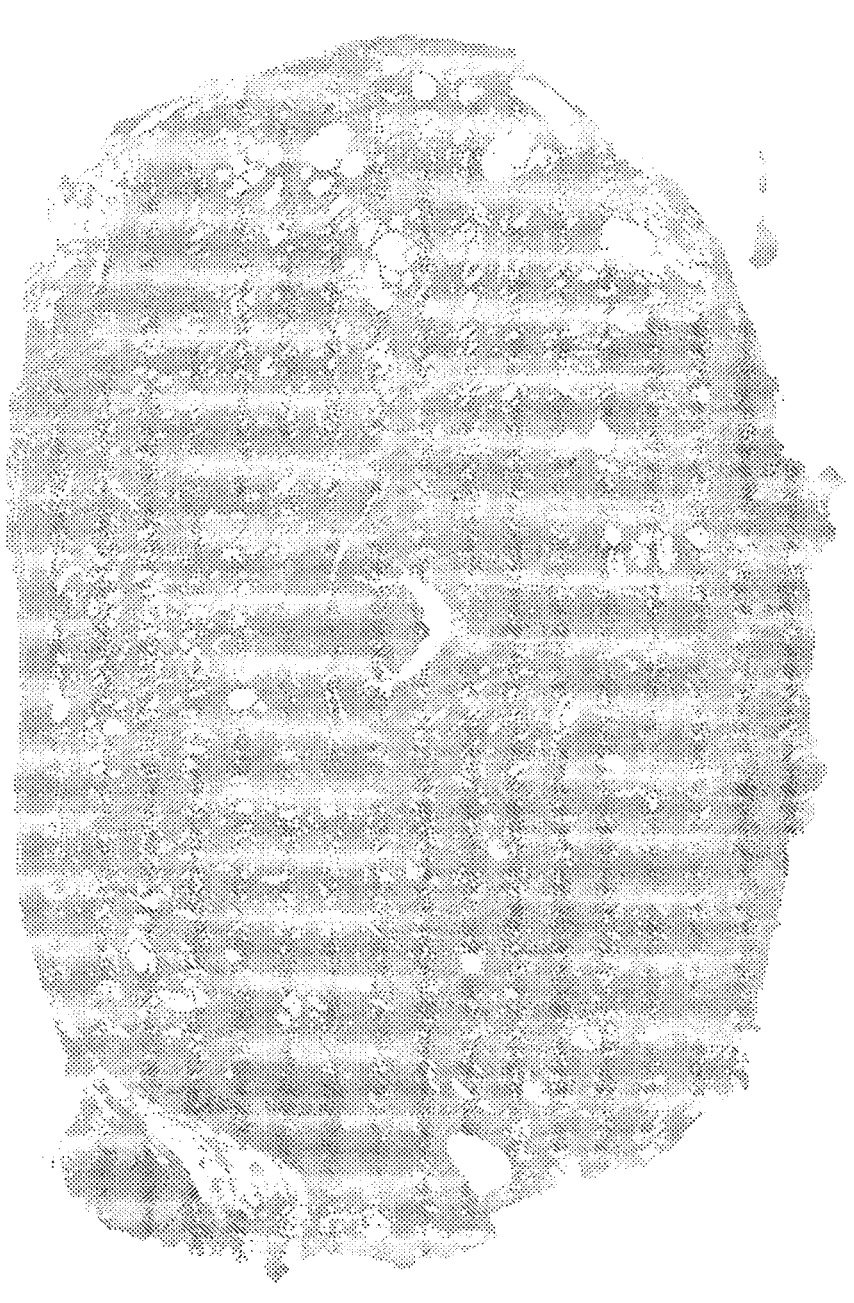
FIG. 3A is a substitute photograph for drawing, depicting in grey scale a photograph given to the classification device.
Figure 3B:
FIG. 3B is a substitute photograph for drawing, depicting in monochrome 2-level gradation a photograph given to the classification device.

FIG. 3A is a substitute photograph for drawing, depicting in grey scale a photograph given to the classification device. FIG. 3B is a substitute photograph for drawing, depicting in monochrome 2-level gradation a photograph given to the classification device. These drawings are pathology photographs captured in color, which can be used as learning photographs and determination photographs, but any photographs such as black and white photographs, infrared photographs, and roentgenograms can be used. In the present application, color photographs are depicted in grey scale and in monochrome 2-level gradation because of the constraints on application documents filing (the same applies to the other drawings). These pathology photographs were taken for prognostication to predict recurrence of a prostate cancer and the captured targets are classified into two groups (L=2), that is, the group $G_1$ with a recurrence within one year after the photograph was taken and the group $G_2$ with no recurrence for not less than one year after the photograph was taken.

Figure 4A:
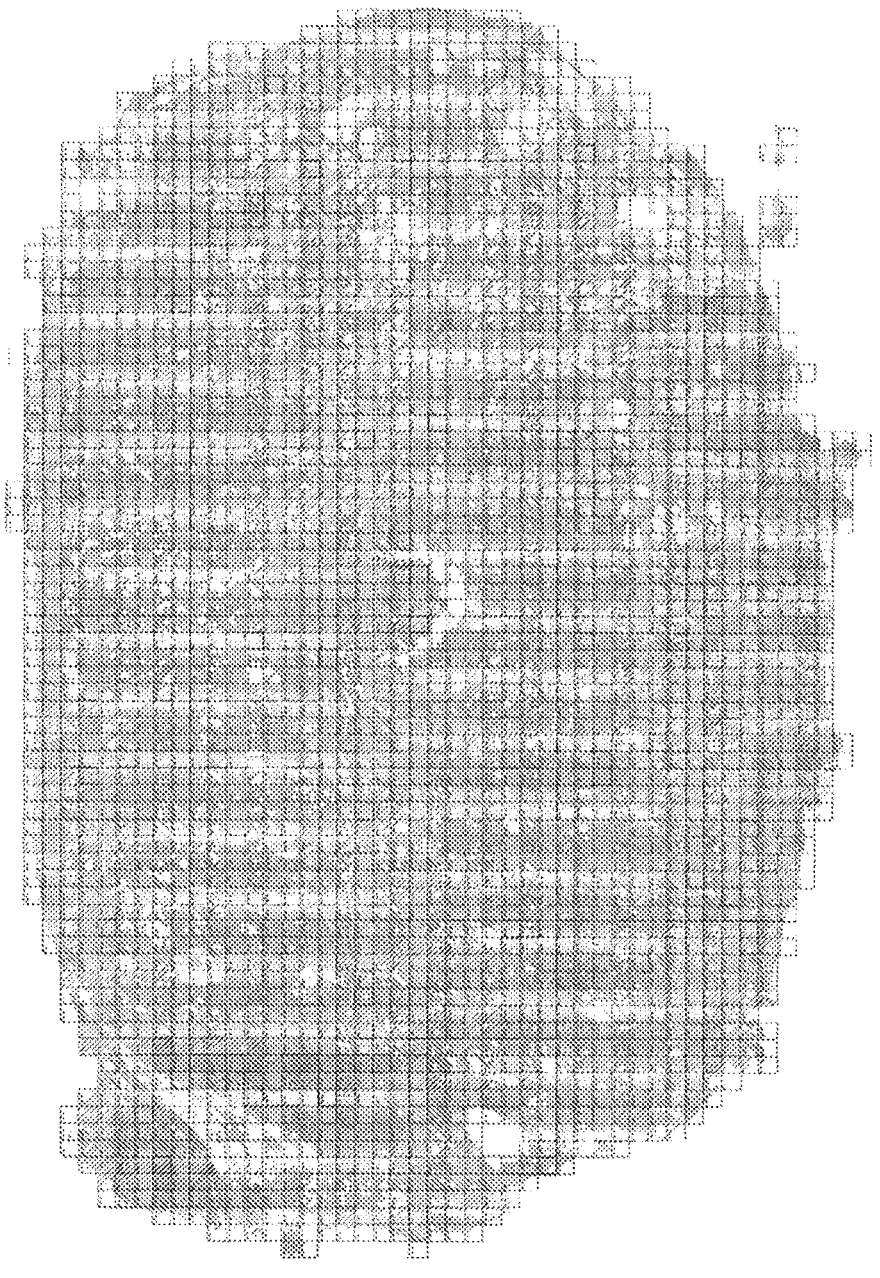
FIG. 4A is a substitute photograph for drawing, depicting in grey scale a divided state of the photograph given to the classification device.
Figure 4B:
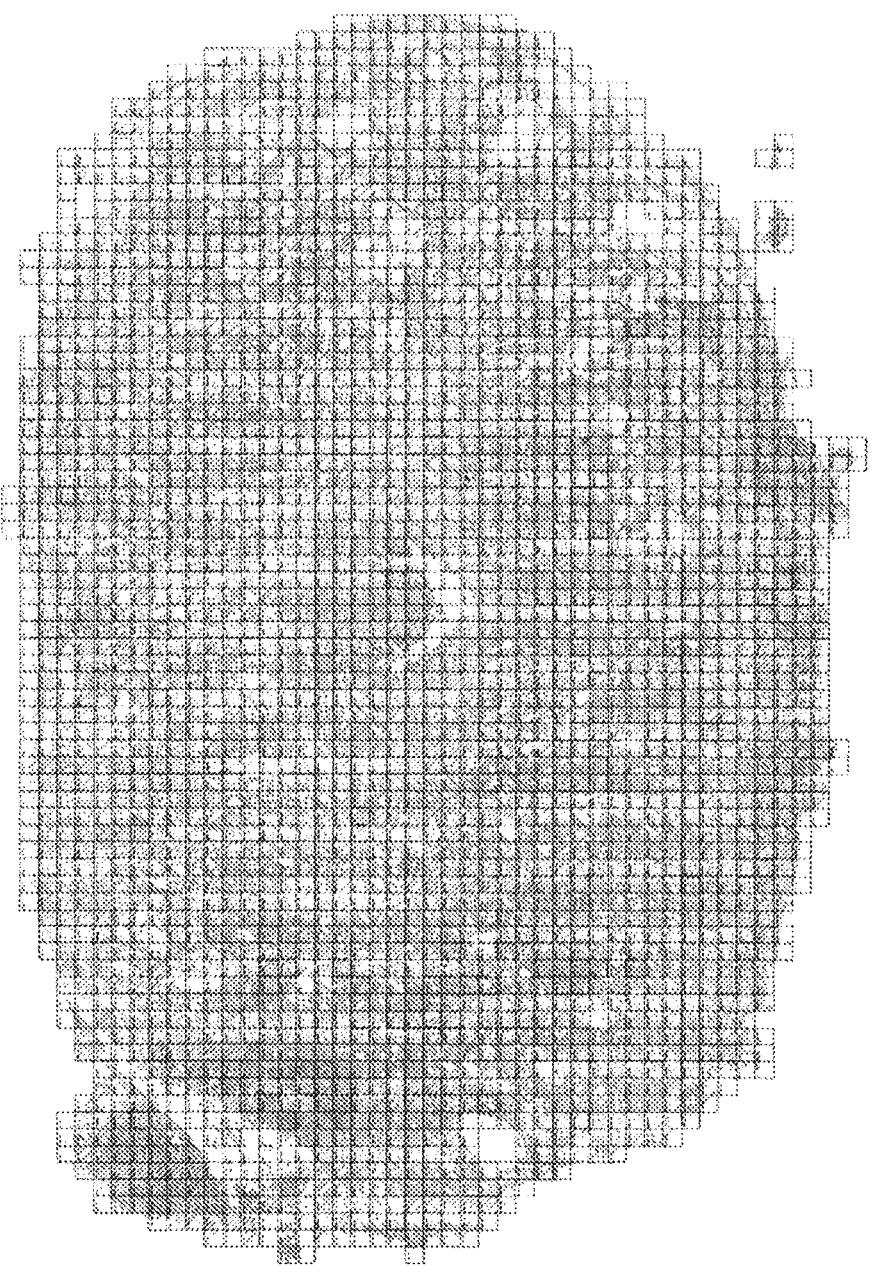
FIG. 4B is a substitute photograph for drawing, depicting in monochrome 2-level gradation a divided state of the photograph given to the classification device.

FIG. 4A is a substitute photograph for drawing, depicting in grey scale a divided state of the photograph given to the classification device. FIG. 4B is a substitute photograph for drawing, depicting in monochrome 2-level gradation a divided state of the photograph given to the classification device. These drawings illustrate the way a learning photograph or a determination photograph is divided in a mesh and the content in each cell serves as a learning image or a determination image. In these drawings, the backgrounds are removed by the film scanner when the pathology photographs are scanned. Thus, the cells of the main part of the sample and the cells of the border parts of the fixative of the sample serve as learning images or determination images.

Figure 5A:
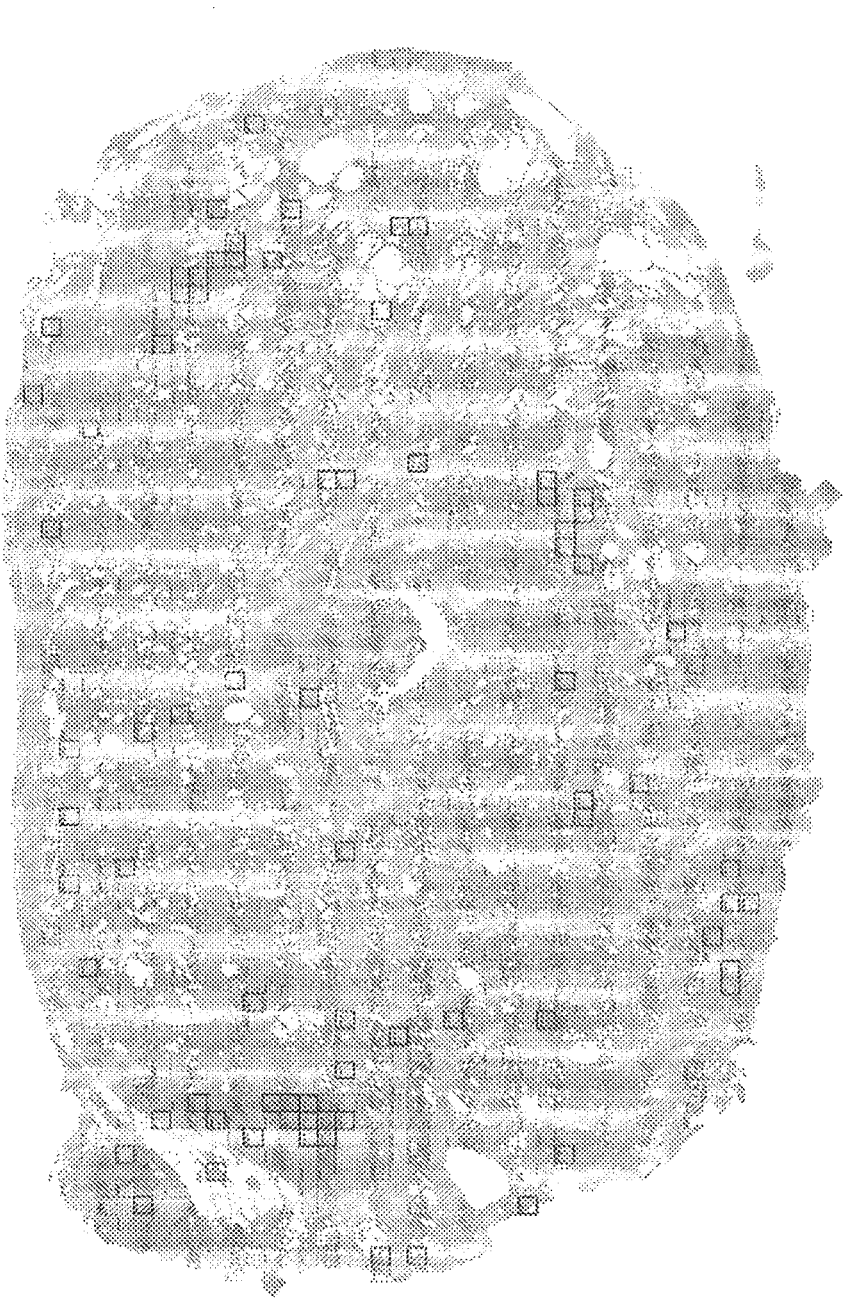
FIG. 5A is a substitute photograph for drawing, depicting in grey scale the photograph given to the classification device, the regions representative of each group highlighted on the photograph.
Figure 5B:
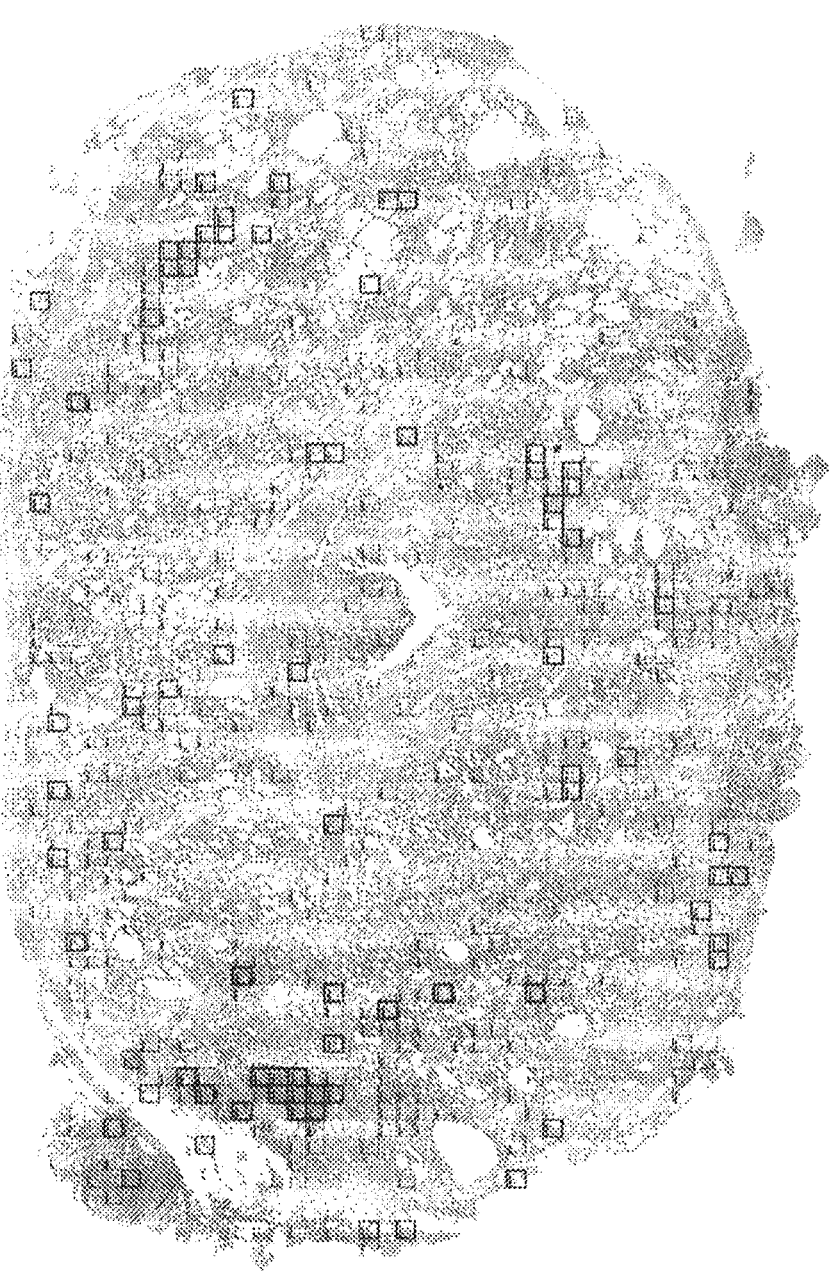
FIG. 5B is a substitute photograph for drawing, depicting in monochrome 2-level gradation the photograph given to the classification device, the regions representative of each group highlighted on the photograph.

FIG. 5A is a substitute photograph for drawing, depicting in grey scale the photograph given to the classification device, the regions representative of each group highlighted on the photograph. FIG. 5B is a substitute photograph for drawing, depicting in monochrome 2-level gradation the photograph given to the classification device, the regions representative of each group highlighted on the photograph. In these drawings, the regions corresponding to the images classified into the class representing the group $G_1$ are enclosed in a thick line while the regions corresponding to the images classified into the class representing the group $G_2$ are enclosed in a thin line, based on the result of the learning.

Figure 6A:
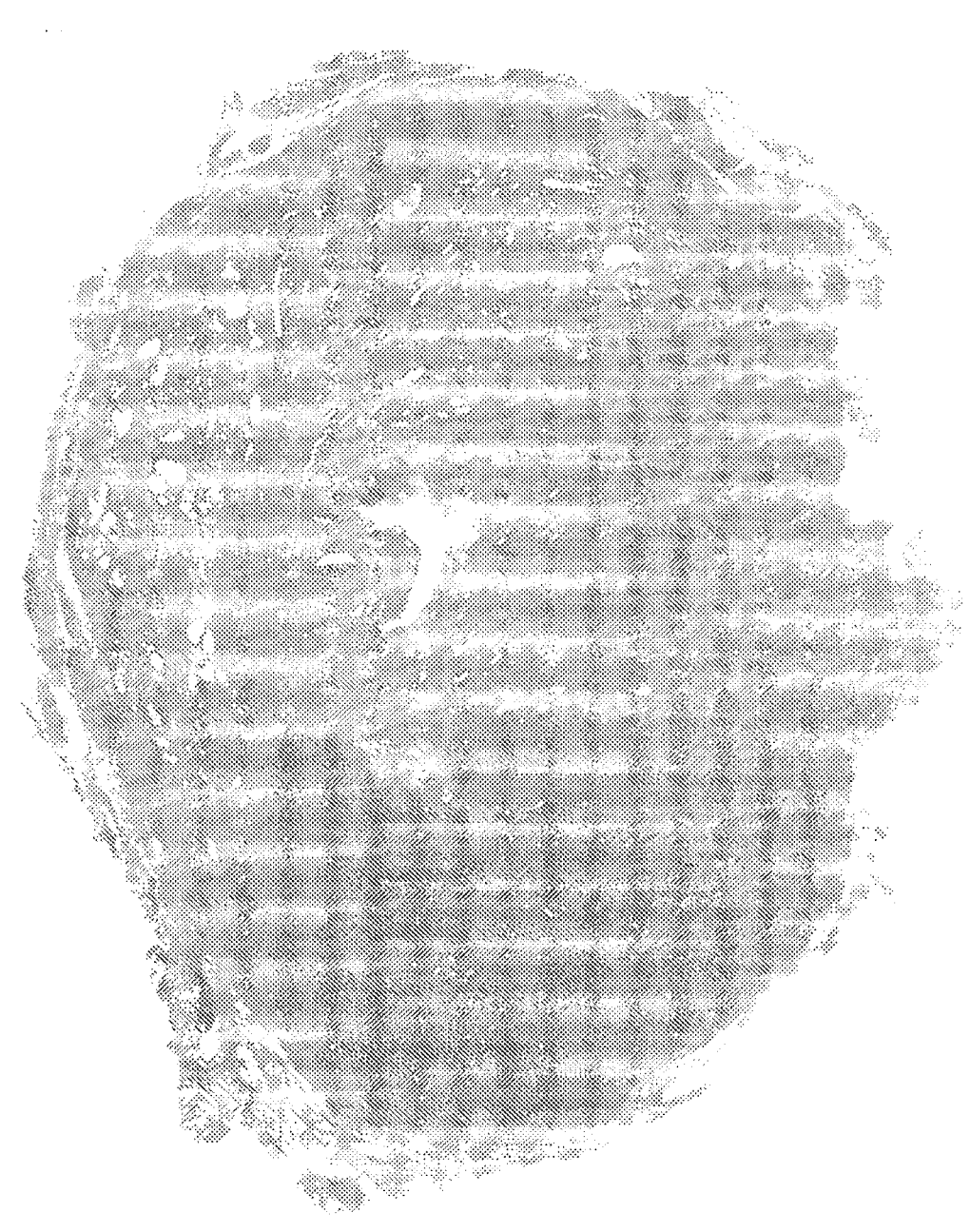
FIG. 6A is a substitute photograph for drawing, depicting in grey scale a photograph of another case.
Figure 6B:
FIG. 6B is a substitute photograph for drawing, depicting in monochrome 2-level gradation a photograph of another case.
Figure 7A:
FIG. 7A is a substitute photograph for drawing, depicting in grey scale the photograph of another case, the regions representative of each group highlighted on the photograph.
Figure 7B:
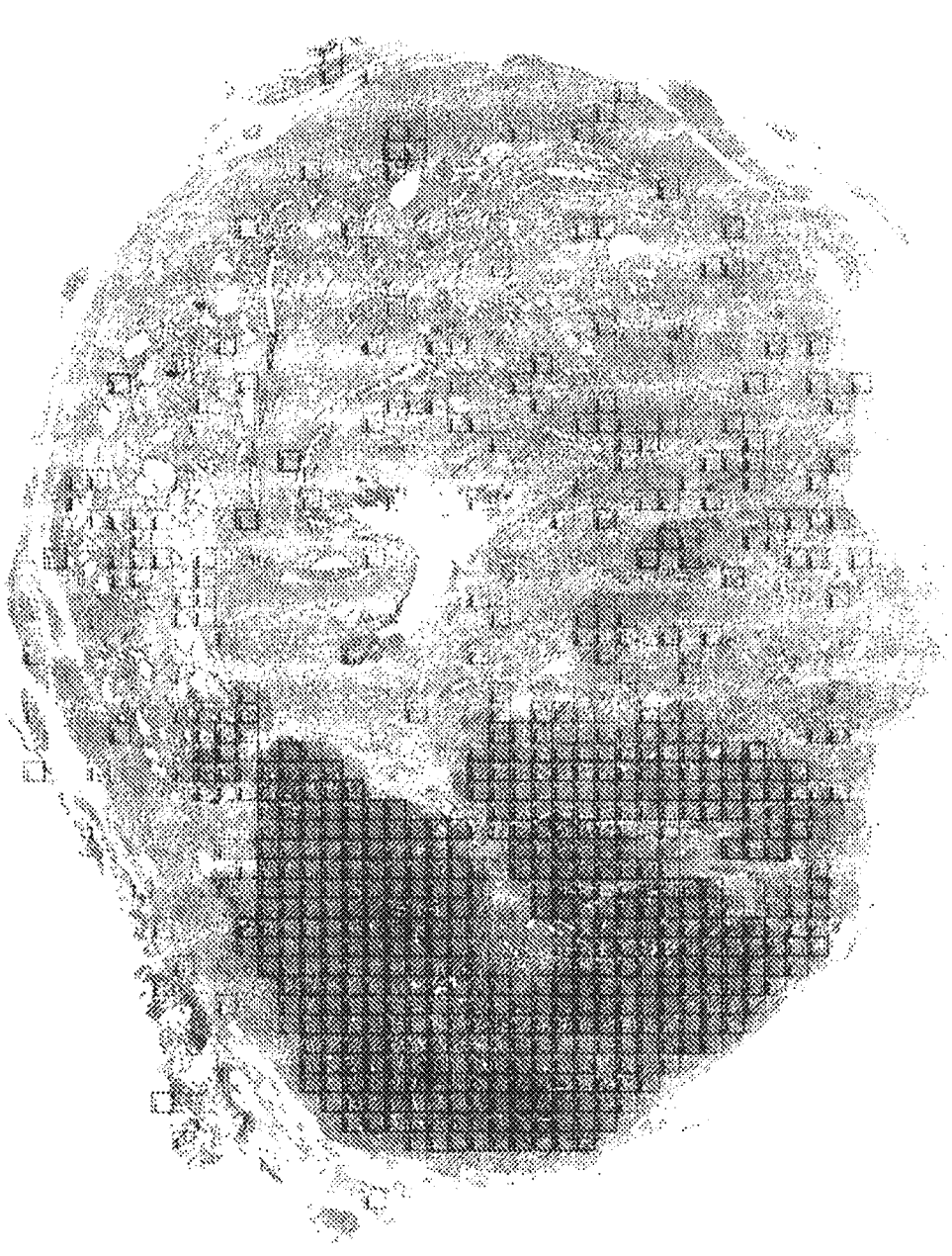
FIG. 7B is a substitute photograph for drawing, depicting in monochrome 2-level gradation the photograph of another case, the regions representative of each group highlighted on the photograph.

FIG. 6A is a substitute photograph for drawing, depicting in grey scale a photograph of another case. FIG. 6B is a substitute photograph for drawing, depicting in monochrome 2-level gradation a photograph of another case. FIG. 7A is a substitute photograph for drawing, depicting in grey scale the photograph of another case, the regions representative of each group highlighted on the photograph. FIG. 7B is a substitute photograph for drawing, depicting in monochrome 2-level gradation the photograph of another case, the regions representative of each group highlighted on the photograph. These are pathology photographs taken of a different target and processed in the same way.

In the examples illustrated in these drawings, the regions enclosed in a thick line are considered to be at a high malignancy while the regions enclosed in a thin line are considered to be at a high benignancy. There are many malignant regions in FIGS. 7A and 7B and the ratio of the number of malignant regions to that of the benign regions in these drawings is significantly greater than the ratio of the number of malignant regions to that of the benign regions in FIGS. 5A and 5B. Thus, the prognosis of the patient of FIGS. 7A and 7B can be predicted to be worse than that of the patient of FIGS. 5A and 5B.

When this pathology photograph is used as a learning photograph and the target originally belongs to group $G_1$, it means that the right answer was given with respect to this pathology photograph and that the learning progressed and, when the target originally belongs to the group $G_2$, the target of this pathology photograph can be regarded as exhibiting an exceptional symptom.

Thus, the classification device 101 allows the provision of important information to help a doctor, a technician, and the like to make a diagnosis, determination, and the like as well as to decide on a treatment strategy, countermeasures, and the like.

Second Model

In the case described above, the user is informed of the regions on the determination photographs that are worthy of attention when classifying the determination target to a group, the user's determination being assisted therewith. According to the present embodiment, to take one step further, the group itself to which the determination target should belong is inferred or an impact factor representing the likelihood that the determination target belongs to each group is inferred.

In the classification device 101 according to the present embodiment, a second learner 107 learns a second model with which the learning target captured on each learning photograph $S_i$ is assigned to one of the plurality of groups $G_1, G_2, . . . , G_L$, based on a distribution of groups $G_{x(y(i,1))}$, $G_{x(y(i,2))}, . . . ,$ which are associated with classes $C_{y(i,1)}$, $C_{y(i,2)}, . . . ,$ into which the compressed vectors $v_{i,1}$, $v_{i,2}, . . .$ are classified.

For example, when 10% of the learning images $S_{i,1}$, $S_{i,2}, . . .$ the learning photograph $S_i$ are assigned to the group $G_1$, 90% are assigned to the group $G_0$, and no learning image is assigned to the groups $G_2, \ldots, G_L$, it can be assumed that the learning target captured on the learning photograph $S_i$ should be assigned to the group $G_1$.

When the learning target is originally classified into the group $G_1$, it means that the learning with the first model and the second model is progressing well but, when the learning target is originally classified into any of the group $G_2, \ldots, G_L$, it means the learning with the first model and the second model went wrong.

The classification device 101 compares the group into which the learning target was originally classified and the group to which the learning target was assigned according to the second model and, by minimizing the difference and increasing accuracy at the first learner 103 and the second learner 107, can perform further learning more appropriately.

For example, the classification device 101 may employ a technique of slightly changing the first model and the second model as a trial like trial and error or random walk and of adopting the changed model when the difference turns out smaller.

Apart from this, an evaluation function for minimizing the difference between the two groups may be defined, and first model and the second model may be modified by back propagation, the method of steepest descent, or the like.

It is thereby possible to increase the accuracy of the classification according to the first model and the assignment according to the second model.

The inferrer 108 of the classification device 101 then infers to which group among the plurality of groups $G_1$, $G_2, \ldots, G_L$ the determination target belongs, using the learned second model, on the basis of the distribution of the groups identified for the plurality of determination images obtained by dividing the determination photograph on which the determination target is captured.

Here, in the second model, to classify the inputted target into one of the plurality of groups $G_1, G_2, \ldots, G_L$, a support vector machine, logistic regression, ridge regression, lasso regression, a neural network, random forests, or the like can be employed.

When a score vector is calculated for each of the plurality of determination images, as in the case of the learning images, and the summation of the score vectors (to be referred to as "determination summation") is calculated, k-th component of the determination summation represents the degree to which the determination photograph, which is the aggregate of the determination images, is classified into the class $C_k$.

In other words, score vectors $q_1, q_2, \ldots$ are calculated using the first model for a plurality of determination images $R_1, R_2, \ldots$, which are obtained by dividing the determination photograph R, and a determination summation $Q = \Sigma_i q_i$ is then calculated. The determination summation Q is an M-dimensional vector, the k-th component $Q_k$ thereof representing the degree to which the determination photograph R is related to the class $C_k$.

Then, the value of the k-th component $Q_k$ of the determination summation Q is given as a score to the group $G_{x(k)}$ associated with the class $C_k$. The accumulated scores for respective groups represent to which group and to what extent the determination photograph R resembles.

That is, the score $W_h$ for the group $G_h$ is calculated as:

$W_h = \Sigma_{x(k)=h} Q_k$. Then the impact factor $P_h$ in accordance with the probability that the determination target captured on the determination photograph R belongs to the group $G_h$ is inferred as:

$P_h = W_h / \Sigma_h W_h$. The greater the impact factor $P_h$ is, the greater the probability that the determination target captured on the determination photograph R belongs to the group $G_h$ is.

Thus, the users such as doctors can make a diagnosis or a decision on the group among $G_1, G_2, \ldots, G_L$ to which the determination target should belong, taking into consideration the impact factors $P_1, P_2, \ldots, P_L$, obtained from the determination photograph R.

An approach that can be employed apart from this may be to calculate the maximum value $W_k$ from $W_1, W_2, \ldots, W_L$ and let $k = \text{argmax}_h W_h$;

$P_k = 1$ and as for the rest, $P_{h|h \neq k} = 0$. In this approach, it is inferred that the determination target captured on the determination photograph R belongs to the group $G_k$.

A calculation similar to the impact factor $P_h$ calculated here may be made for the learning photographs and the learning images to increase accuracy of the first model and the second model. The learning is then performed taking it into account that the group classification of the learning target prepared in advance is actually probabilistic and an improvement of the accuracy of inference can be thereby expected.

Stage 1 and Stage 2

In the process described above, the group to which the target captured on a learning photograph or a determination photograph is learned or determined on the basis of learning images and determination images that are obtained by dividing the learning photograph and the determination photograph. This process is to be referred to as Stage 1 hereinafter.

The learning images and the determination images in Stage 1 are obtained by dividing a learning photograph and a determination photograph and reducing the resolution when necessary. Thus, the process in Stage 1 can be regarded as an observation of the learning photograph and the determination photograph that are divided and expanded.

Figure 8:
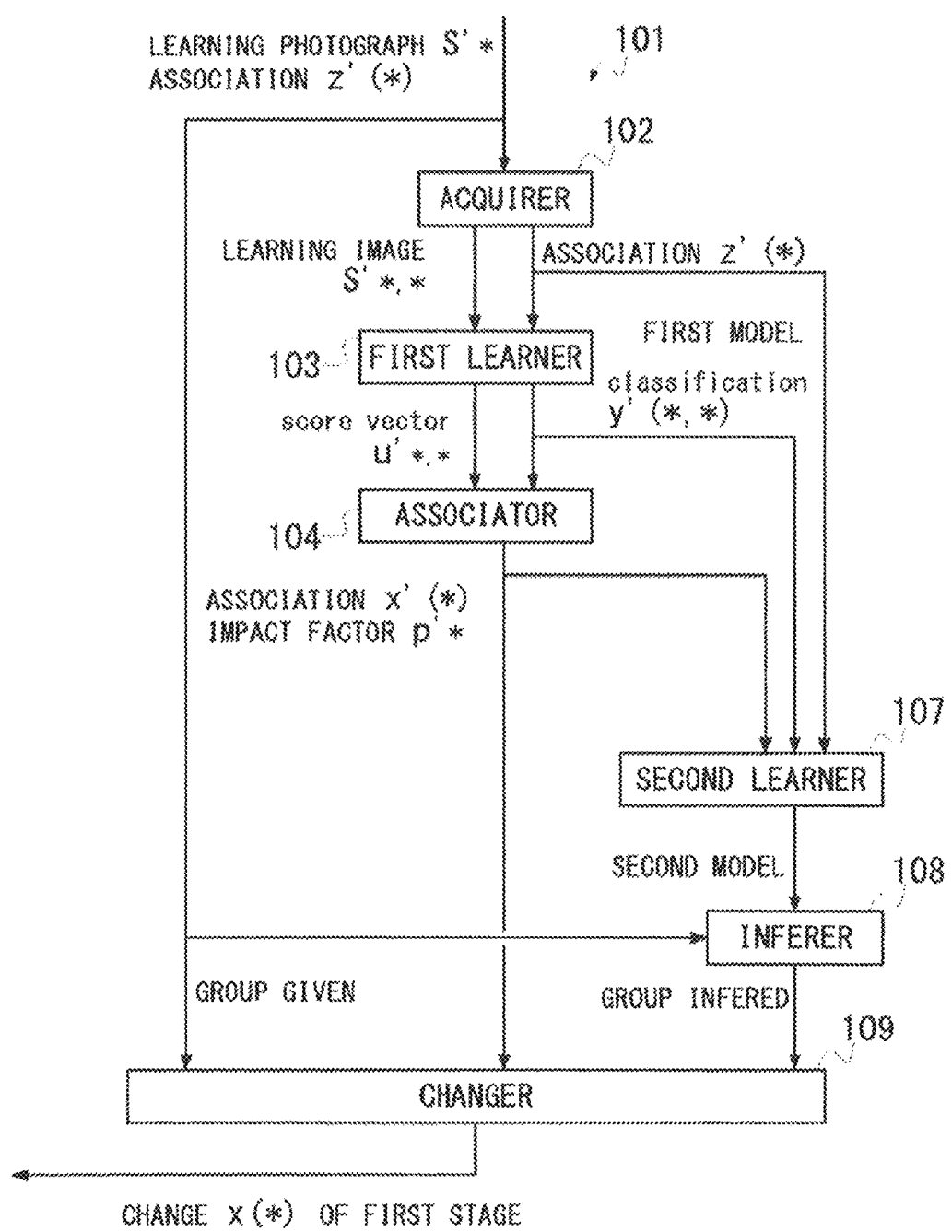
FIG. 8 is an explanatory diagram illustrating a schematic configuration of a classification device (Stage 2) according to an embodiment of the present disclosure.

A technique for further increasing the accuracy of the learning in Stage 1 will be described below, using a classification device 101 similar to that in Stage 1. The process in this stage will be referred to as Stage 2. FIG. 8 is an explanatory diagram illustrating a schematic configuration of a classification device (Stage 2) according to an embodiment of the present disclosure. The receiver 105 and the identifier 106 are omitted (not illustrated) for the classification device 101 in Stage 2. A changer 109 for modifying the result in Stage 1 is added.

In Stage 2, to the acquirer 102 is newly given the learning images classified into a class $C_{k|x(k)=h}$ associated with each group $G_h$ of the plurality of groups $G_1, G_2, \ldots, G_L$ in Stage 1 and the group $G_h$, as the learning photograph and the group to which the learning target belong.

In other words, no processing is performed on the learning images classified into any class associated with the group $G_0$ in Stage 2.

The learning images $S_{i,j}$ to be processed in Stage 2 are those classified into class $C_{y(i,j)}$ and considered to belong to a group $G_{x(y(i,j))}$ other than group $G_0$ in Stage 1. Therefore, the pair of indices (i,j) to be processed satisfies $x(y(i,j)) \in \{1, 2, \ldots, L\}$ or $x(y(i,j)) \neq 0$.

In Stage 2, the learning images $S_{i,j|x(y(i,j))\in\{1,2,\ldots,L\}}$ that satisfy the above conditions are numbered anew and given to the classification device 101 as a plurality of learning photographs $S'_1$, $S'_2$, . . . . Hereinafter the relation between the pair of indices (i,j) and the value k for the new indices given by numbering the pair (i,j) anew is denoted by a function as:

$$(i,j)=f(k).$$

In Stage 2, the learning photographs $S'_1$, $S'_2$, . . . and the association z'(k) are given to the acquirer 102, assuming that the target captured on the learning photograph $S'_k$ belongs to the group $G_{z'(k)}$. As in Stage 1, images obtained by further dividing $S'_1$, $S'_2$, . . . may be given to the acquirer 102.

Here, the learning image $S_{i,j}$ corresponding to the pair of indices (i,j) that satisfies x(y(i,j))∈{1, 2, . . . , L} should belong to the group $G_{x(y(i,j))}$.

The learning photograph $S'_k$ in Stage 2 is the learning image $S_{f(k)}$ in Stage 1. The learning image $S_{f(k)}$ is classified into class $C_{y(f(k))}$ in Stage 1. Therefore, it has been learned that the learning image $S_{f(k)}$ should belong to group $G_{x(y(f(k)))}$. Thus the association in Stage 2 is:

$$z'(k)=x(y(f(k))).$$

Thus, a plurality of learning photographs and the association in Stage 2 are designated based on the plurality of learning images and the result of learning in Stage 1 and given to the classification device 101 in Stage 2, and division, association, and acquisition by the acquirer 102, learning by the first learner 103, association by the associator 104, learning by the second learner 107, and inference by the inferrer 108 are newly executed.

Here, the classification device 101 in Stage 1 and the classification device 101 in Stage 2 may be configured in almost the same manner but, as the characteristics of the target images are different, the first model and the second model to be learned will also be different.

Further, the first learner 103 in Stage 1 and the first learner 103 in Stage 2 may be configured differently, for example, the former performing classification by k-means clustering on the result of the autoencoder as illustrated in FIGS. 2A and 2B while the latter performing classification according to the maximum component of the vector resulting from the autoencoder.

Figure 9:
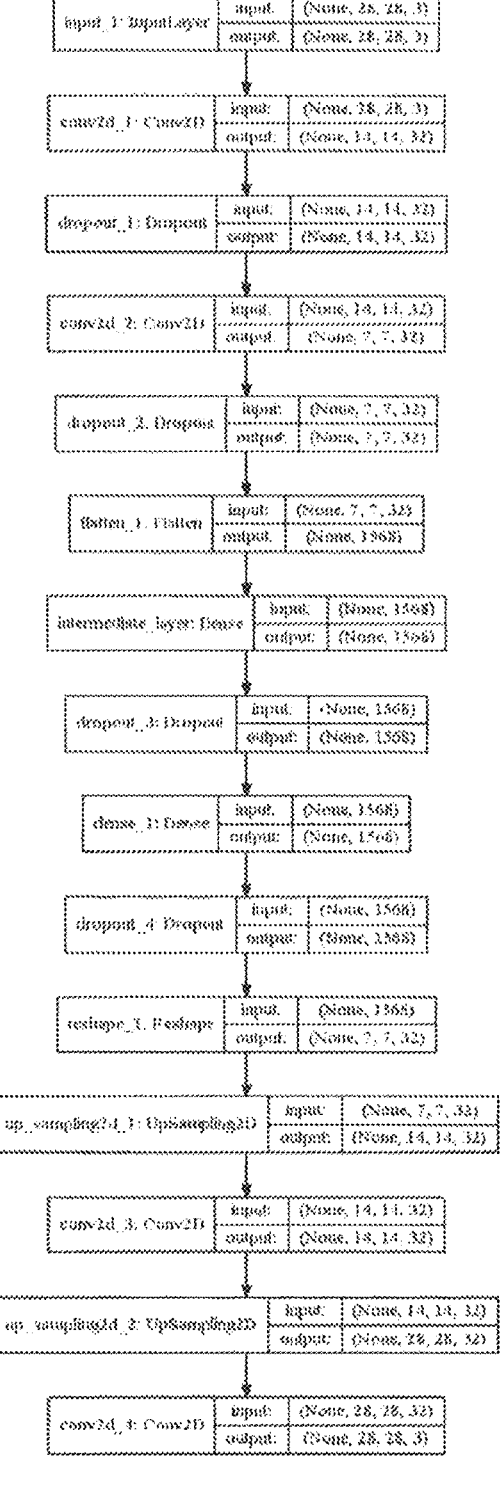
FIG. 9 is an explanatory diagram illustrating an example autoencoder of deep learning utilizable for learning a first model.

FIG. 9 is an explanatory diagram illustrating an example autoencoder of deep learning utilizable for learning a first model. An embodiment using the autoencoder as illustrated in the drawing in the first learner 103 in Stage 2, for example, is possible.

When the learning in Stage 2 is thus performed, the impact factor p'i for each learning photograph $S'_i$ is calculated. The $p'_i$ is an L-dimensional vector and, as described above, has a value relating to the probability that the learning photograph $S'_i$ belongs to the groups $G_1$, $G_2$, . . . , $G_L$.

The class $C_k$ is associated with the group $G_{x(k)}$ in Stage 1 and this association is examined in Stage 2 to see whether or not the association is correct. The learning photograph $S'_i$ in Stage 2 corresponds to the learning image $S_{f(i)}$ in Stage 1 and the learning image $S_{f(i)}$ is classified into the class $C_{y(f(i))}$ in Stage 1.

Thus, the changer 109 calculates in Stage 2 the summation of the inferred impact factors $Z_k$ as:

$$Z_k=\Sigma_{i|y(f(i))=k}p'_i$$

for each learning image classified into each class $C_k$ in Stage 1.

The summation $Z_k$ expresses as an L-dimensional vector the distribution of the extent to which the plurality of learning images classified into the class $C_k$ in Stage 1 should belong to each group $G_1$, $G_2$, . . . , $G_L$ (the extent calculated in Stage 2).

When the class $C_k$ is associated with the group $G_h$ in Stage 1 (h=x(k)), the h-th component of the summation $Z_k$ calculated for the class $C_k$ should be at a certain high rank in the summation $Z_k$ (for example, at the highest rank) if this association is correct.

Thus, when the group $G_h$ with which the class $C_k$ is associated is not at a certain high rank in the distribution, the changer 109 changes the association of the class $C_k$ in Stage 1 from the group $G_h$ to the group $G_0$.

Here, the certain high rank may be the highest rank or may be a rank appropriately adjusted, for example, a rank up to the second highest, a rank up to the third highest, . . . , depending on the value of L.

In Stage 2, the association of the classes with the groups in Stage 1 is modified to increase the accuracy of the association of the class representing each group.

Note that the classification device 101 in Stage 2 does not need a receiver 105 or an identifier 106. This is because the classification device 101 in Stage 1 is made more accurate in Stage 2 and then receives the determination images and identifies the group to which the determination images belong.

Exemplary Experiments

Examples of experiments will be described below, in which pathology photographs on which the target sites of subjects were captured were used as targets for the processing, in prognostication for the prediction of recurrence of a prostate cancer.

For the present experiment, 10,505 pathology photographs on which the target sites of 885 patients were captured were used.

The number of the groups was L=2, and classification trials were made either to the group $G_1$ with no recurrence within one year after the photograph was taken (group with no recurrence) or to the group $G_2$ with a recurrence within one year after the photograph was taken (group with recurrence).

Of the pathology photographs of 885 individuals, 100 cases (100 photographs) were used for learning and 785 cases (10,405 photographs) were used for determination (verification) to measure the accuracy of classification.

The pathology photographs are in different sizes because the affected areas are in different sizes in different cases. FIGS. 3A and 3B illustrate an example learning photograph used as a target for the processing in the present experiment, depicted in grey scale/in monochrome 2-level gradation. The original learning photograph was in color and 56,448 pixels in width and 84,224 pixels in height.

In Stage 1, background portions of the pathology photographs were removed to some extent when the pathology photographs were scanned by the scanner. The photographs were then divided into a plurality of sections to obtain divided images, which were used as learning images and determination images. In the examples illustrated in 4A and 4B, divided images of 1024 pixels in height and 1024 pixels in width were obtained.

In the present experiment, the resolution of the divided images was reduced by smoothing to 128 pixels in height and 128 pixels in width for the purpose of increasing the learning efficiency and in light of the need for dividing the images again in Stage 2, and these are used as the learning images and the determination images.

In Stage 1, the number of the classes was M=100, and the first model was learned by deep learning based on the filter configuration illustrated in FIGS. 2A and 2B. Classification into the 100 classes (M=100) by k-means was performed.

Further, in Stage 1, the learning for the second model was performed by machine learning with ridge regression, lasso regression, and a support vector machine, and the most accurate model resulting therefrom was adopted.

Further, in Stage 2, the images divided in Stage 1 were further divided in 28 pixels in height and 28 pixels in width and then processed. In Stage 2, the first model was learned with the filter configuration illustrated in FIG. 9.

The discriminatory power in the case of an experienced doctor predicting prognosis using the Gleason grading system is expressed as 0.758 by calculating the area under the curve (AUC) while the discriminatory power of the processing in Stage 1 was 0.715 and the discriminatory power when the processing in Stage 2 was performed was 0.771. Therefore, the discriminatory power according to the present embodiment is considered to be equal to or greater than that of an experienced doctor.

Figure 10A:
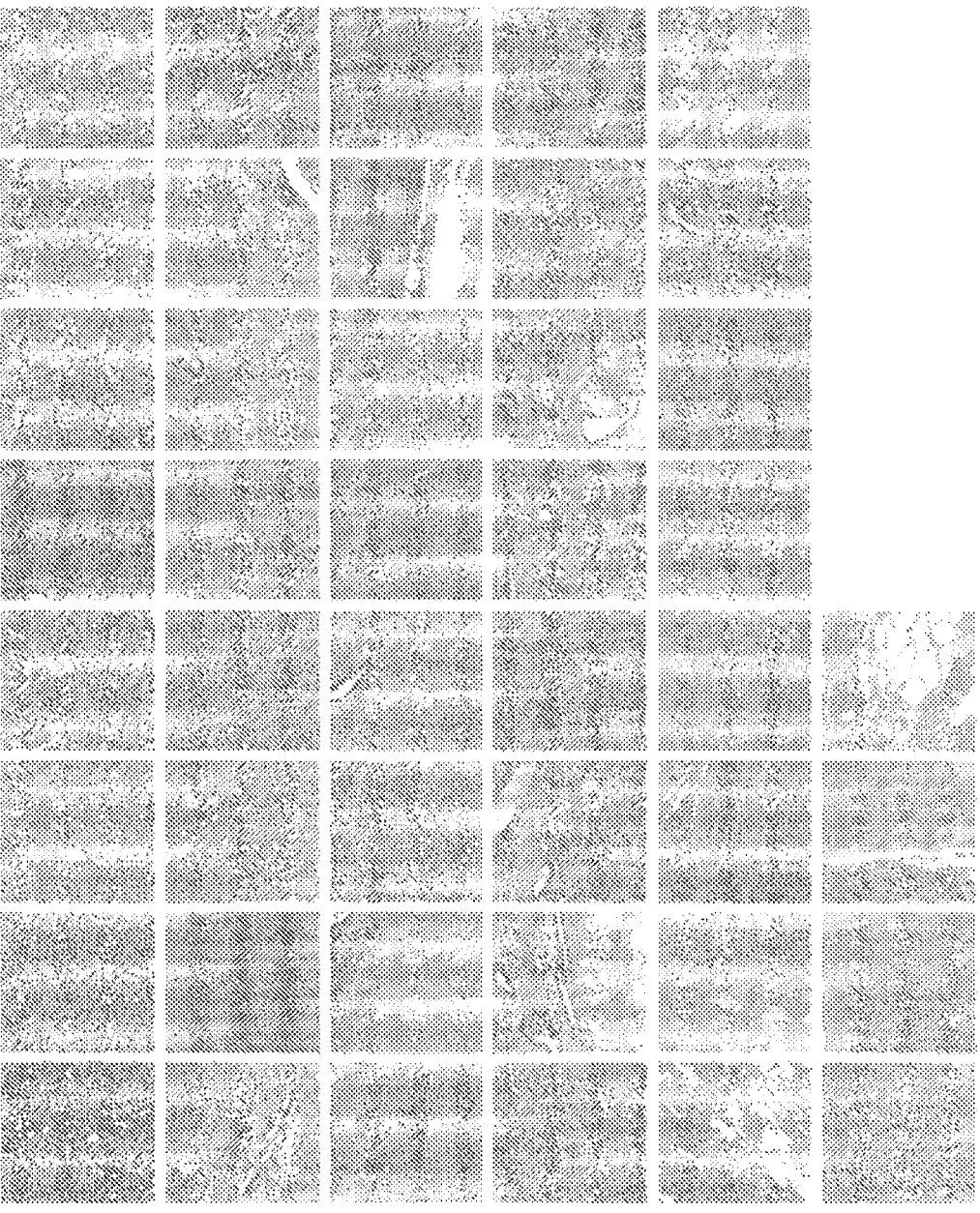
FIG. 10A is a substitute photograph for drawing, depicting learning images that present a characteristic of a group with recurrence in grey scale.
Figure 10B:
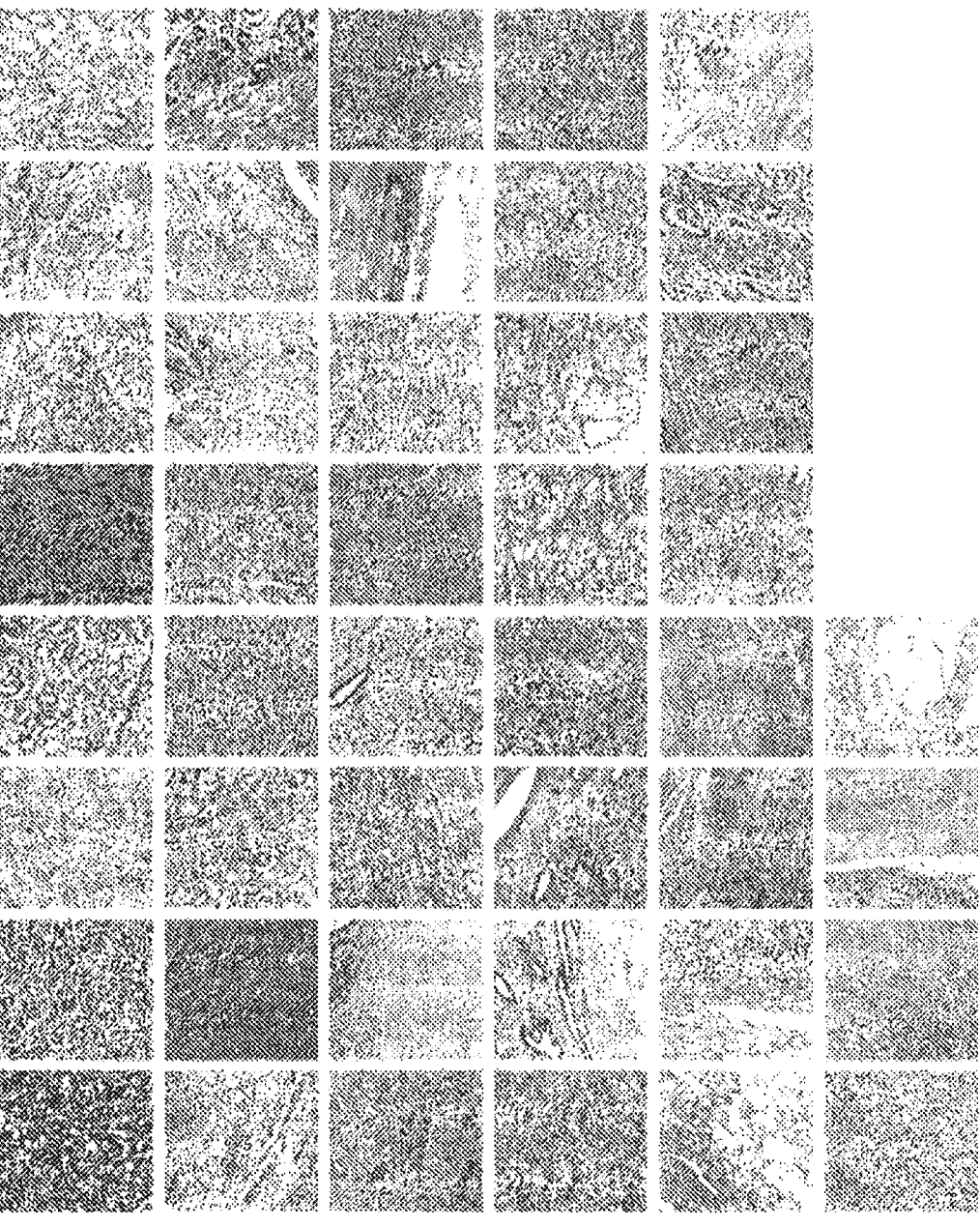
FIG. 10B is a substitute photograph for drawing, depicting learning images that present a characteristic of a group with recurrence in monochrome 2-level gradation.
Figure 11:
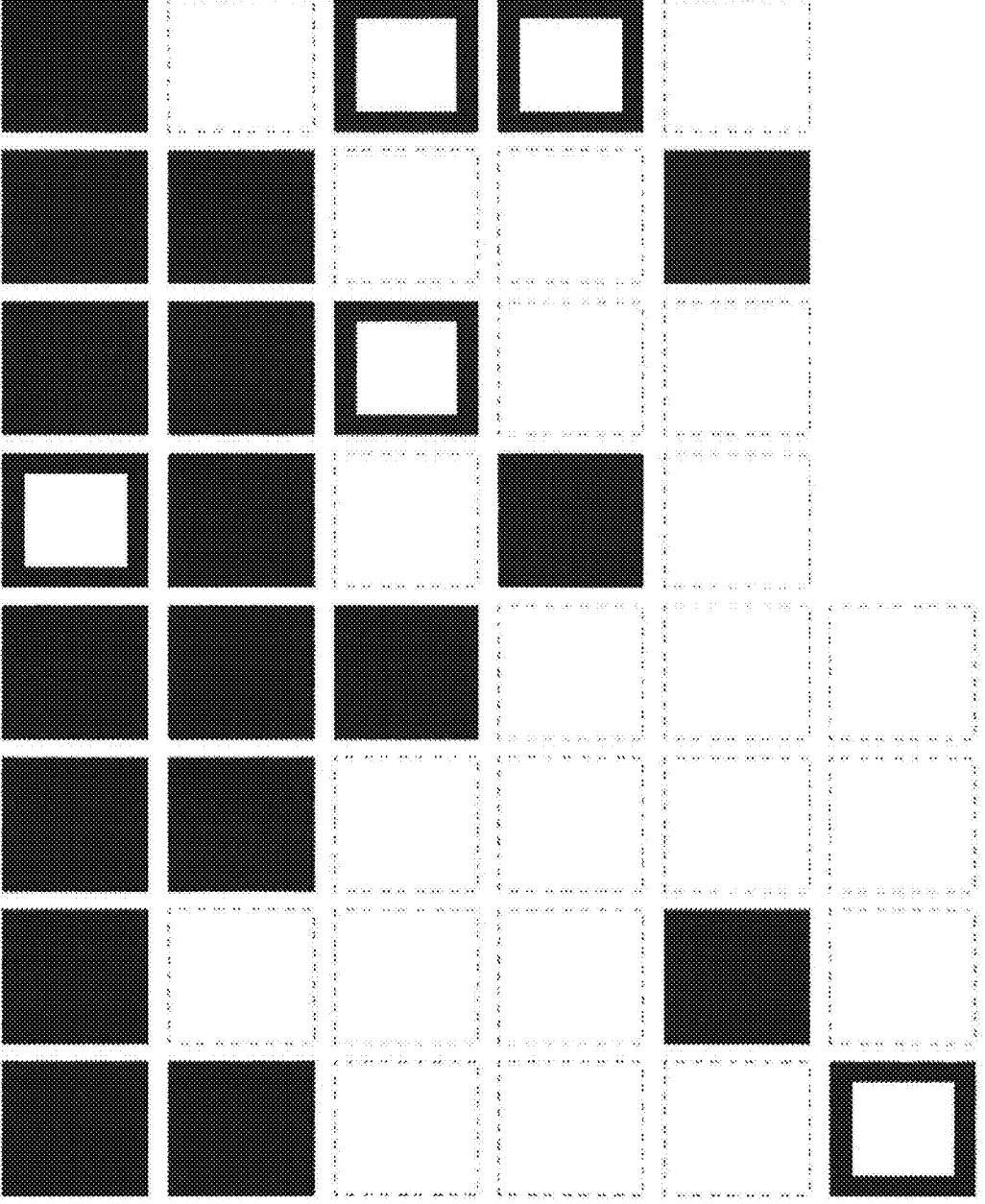
FIG. 11 is an explanatory diagram illustrating positional relations among learning images that present a characteristic of a group with recurrence, making distinction between those recognizable under the Gleason grading system and those unrecognizable.

FIG. 10A is a substitute photograph for drawing, depicting learning images that present a characteristic of a group with recurrence in grey scale. FIG. 10B is a substitute photograph for drawing, depicting learning images that present a characteristic of a group with recurrence in monochrome 2-level gradation. The learning images classified into the group $G_2$ are those presenting a characteristic of a prognosis of recurrence. FIG. 11 is an explanatory diagram illustrating positional relations among learning images that present a characteristic of a group with recurrence, making distinction between those recognizable under the Gleason grading system and those unrecognizable. In this drawing, not only outer appearances that would be regarded under the Gleason grading system as indicating a cancer with a high likelihood of recurrence (black squares in the drawing) but also stroma reactions that would not be recognized under the Gleason grading system (white squares in the drawing) are extracted. Such a stroma reaction was revealed for the first time by the application of the present embodiment.

Figure 12A:
FIG. 12A is a substitute photograph for drawing, depicting learning images that present a characteristic of a group with no recurrence in grey scale.
Figure 12B:
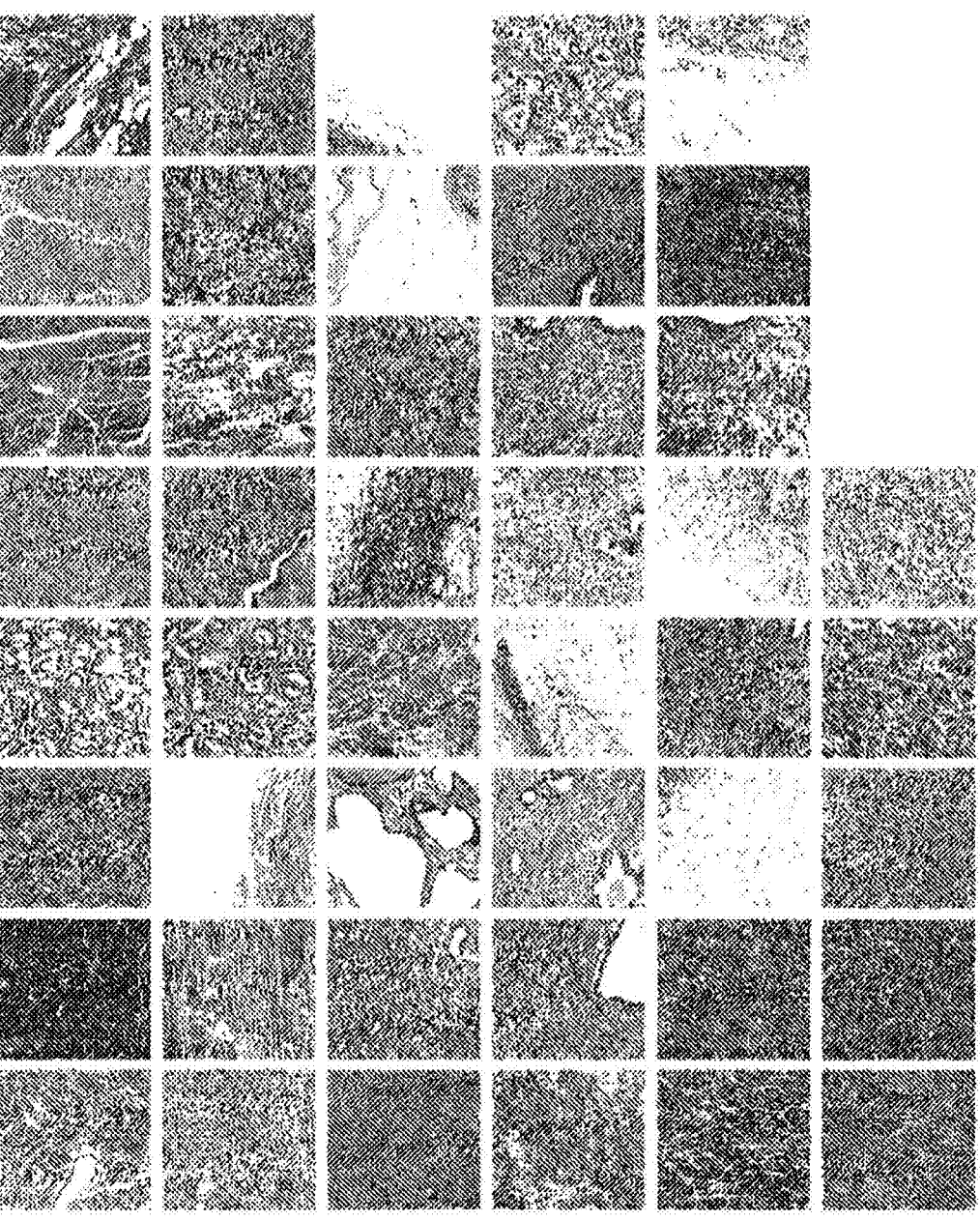
FIG. 12B is a substitute photograph for drawing, depicting learning images that present a characteristic of a group with no recurrence in monochrome 2-level gradation.
Figure 13:
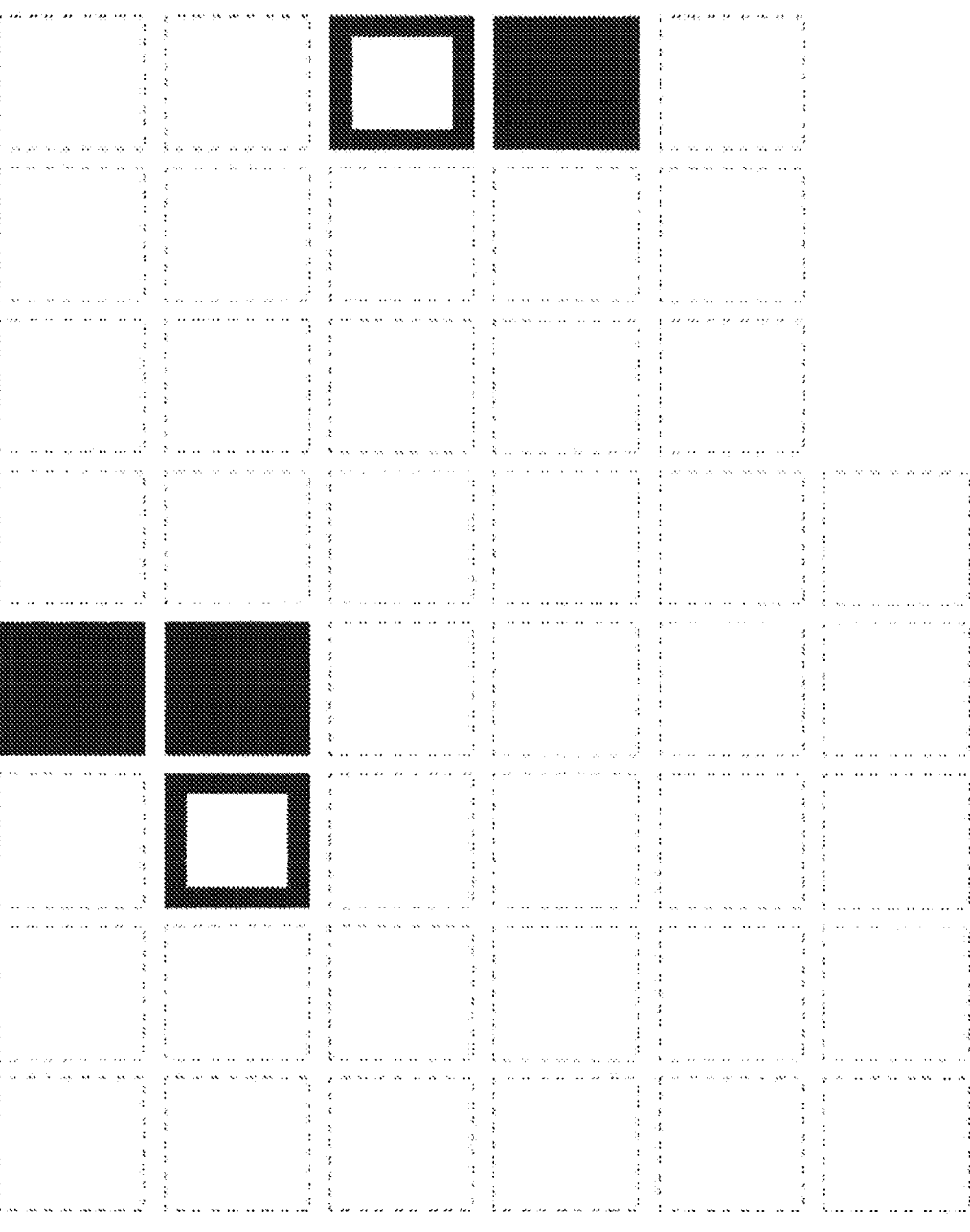
FIG. 13 is an explanatory diagram illustrating positional relations among learning images that present a characteristic of a group with no recurrence, making distinction between those recognizable under the Gleason grading system and those unrecognizable.

FIG. 12A is a substitute photograph for drawing, depicting learning images that present a characteristic of a group with no recurrence in grey scale. FIG. 12B is a substitute photograph for drawing, depicting learning images that present a characteristic of a group with no recurrence in monochrome 2-level gradation. The learning images classified into the group $G_1$ are those presenting a characteristic of a group with no recurrence. FIG. 13 is an explanatory diagram illustrating positional relations among learning images that present a characteristic of a group with no recurrence, making distinction between those recognizable under the Gleason grading system and those unrecognizable. In this drawing, outer appearances that would be regarded under the Gleason grading system as indicating a cancer with a low likelihood of recurrence (black squares in the drawing) are extracted. Here, a cancer with a low likelihood of recurrence is such a cancer that the patient will be placed on no active treatment but PSA monitoring therapy. At the same time, stumps with no cancer at all are also extracted (white squares in the drawing). In the conventional techniques of diagnosis by doctors, the characteristics of the group with no recurrence are often described in contrast to the characteristics of the group with recurrence. According to the present disclosure, the characteristics of the group with no recurrence can be actively described.

Thus, characteristics of the outer appearance of each group that had not been actively recognized were newly found by the present experiment.

Thus, in the present experiment, by using pathology learning photographs and group classification, prognostic prediction as good as that conducted by an experienced doctor was performed at an accuracy comparable to an experienced human individual, new characteristics were found on the outer appearance of a cancer that can be used for the discrimination of the malignancy that relates to recurrence, and the usefulness of the present embodiment was confirmed.

Another Embodiment of Dimensionality Reduction

In the above-described embodiment, dimensionality reduction was performed using an autoencoder or the like. Another embodiment will be described below, in which a transformation device that transforms an input vector to a feature vector with a transformation model performs unsupervised learning and the obtained feature vector is used as a compressed vector.

Basic Configuration of Transformation Device

Figure 14:
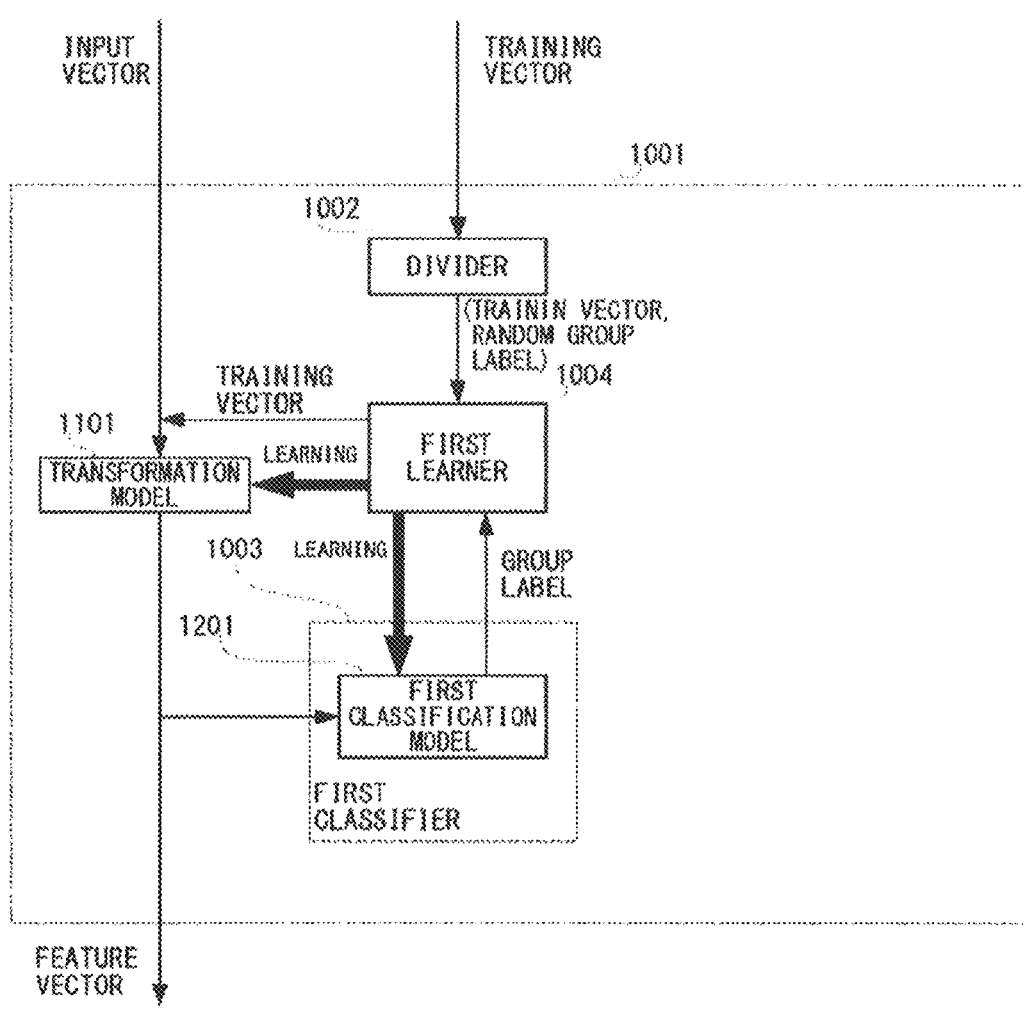
FIG. 14 is an explanatory diagram illustrating a basic configuration of a transformation device according to an embodiment of the present disclosure.
Figure 15:
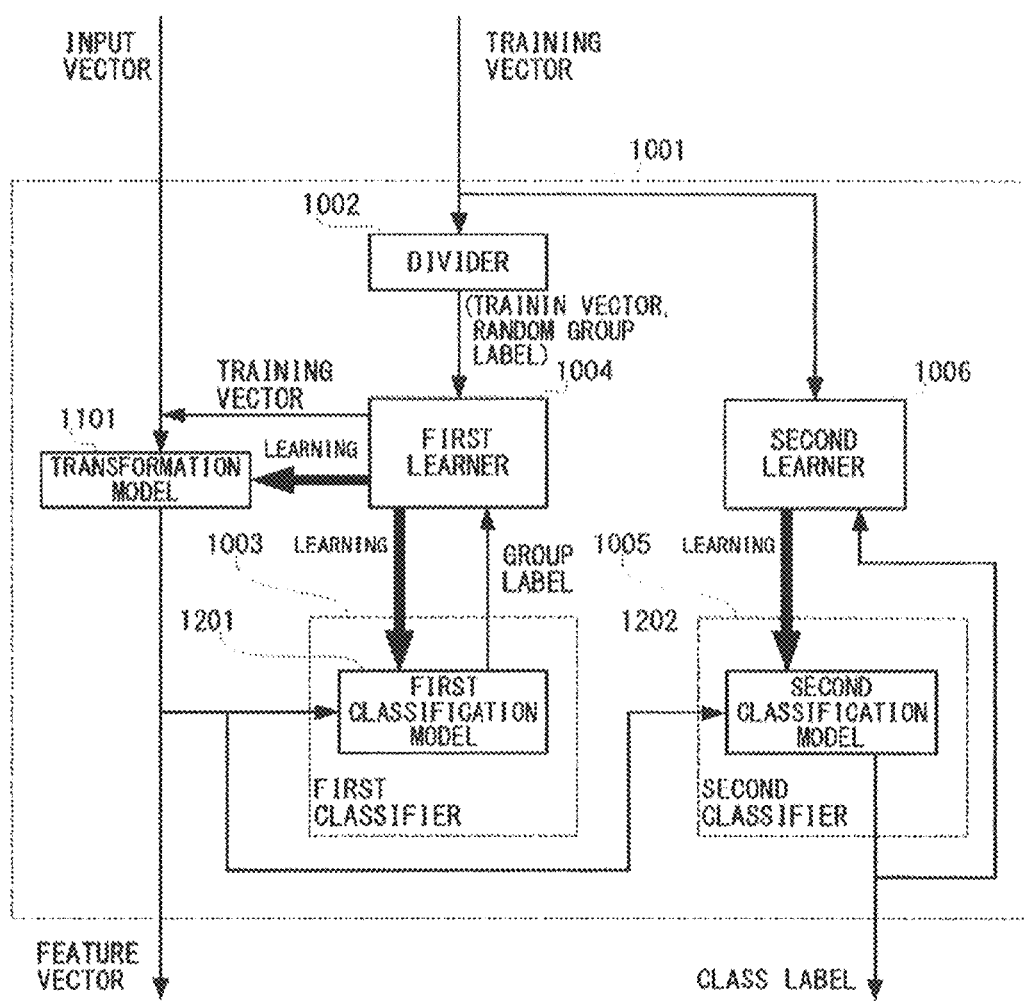
FIG. 15 is an explanatory diagram illustrating a configuration of a transformation device according to an embodiment of the present disclosure, additional components added.

FIG. 14 is an explanatory diagram illustrating a basic configuration of a transformation device according to an embodiment of the present disclosure. FIG. 15 is an explanatory diagram illustrating a configuration of a transformation device according to an embodiment of the present disclosure, additional components added. With reference to these drawings, the present embodiment will be described in outline below.

As illustrated in the two drawings, the transformation device 1001 includes a divider 1002, a first classifier 1003, and a first learner 1004.

It is understood by the comparison of the two drawings that the transformation device 1001 may include a second classifier 1005 and a second learner 1006 as components of an omissible configuration.

As illustrated in the drawing, the transformation device 1001 transforms an input vector to a feature vector according to a transformation model 1101.

Figure 16:
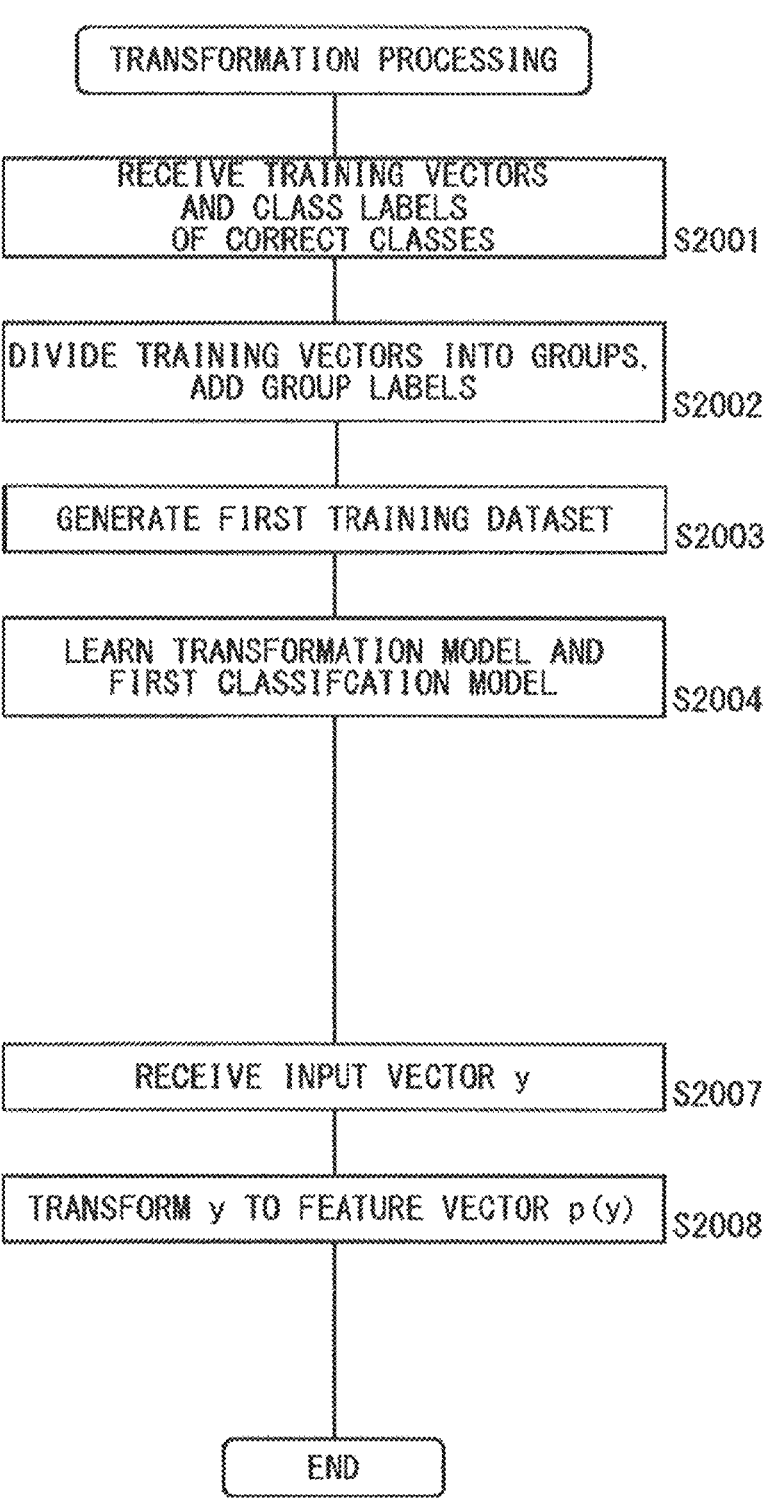
FIG. 16 is a flowchart illustrating processing executed in a basic configuration of a transformation device according to an embodiment of the present disclosure.
Figure 17:
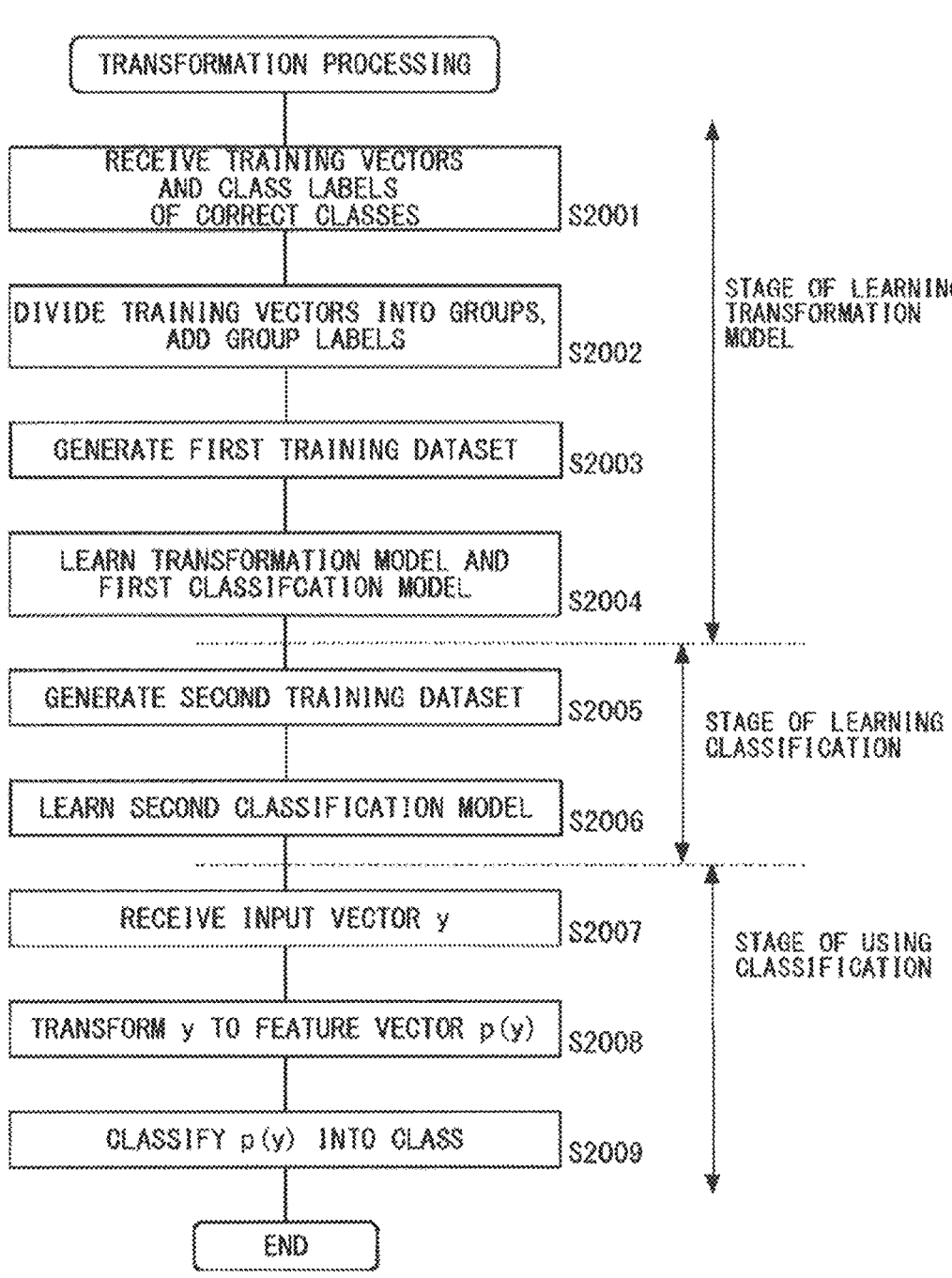
FIG. 17 is a flowchart illustrating processing executed in a configuration of a transformation device to perform classification, according to an embodiment of the present disclosure.

The transformation model 1101 used by the transformation device 1001 needs to be learned in advance. FIG. 16 is a flowchart illustrating processing executed in a basic configuration of a transformation device according to an embodiment of the present disclosure. FIG. 17 is a flowchart illustrating processing executed in a configuration of a transformation device to perform classification, according to an embodiment of the present disclosure. The two drawings will be referred to in the description below.

As illustrated in the two drawings, the processing by the transformation device 1001 can be separated in three stages, that is, the stage of learning the transformation model 1101 (Steps S2001-S2004), the stage of learning the classification (second classification model 1202) (Steps S2005-S2006), the stage of using the classification (Steps S2007-S2009), each of which can be executed independently. Here, the stage of learning the transformation model 1101 is executed in both FIG. 14 and FIG. 15, however, the stage of learning the classification (second classification model 1202) and the stage of using the classification (Step S2009) are omitted in FIG. 14.

First, to learn the transformation model 1101, the transformation device 1001 receives a plurality of training vectors $v_1, v_2, \ldots, v_N$ as typical examples of input vectors (Step S2001). As illustrated in FIGS. 15 and 17, the transformation device 1001 may also receive the class labels c(1), c(2), . . . , c(N) of the correct classes $C_{c(1)}, C_{c(2)}, \ldots, C_{c(N)}$ to which the plurality of training $v_1, v_2, \ldots, v_N$ should respectively belong among the plurality of classes $C_1$, $C_2, \ldots, C_L$, though this is omissible. On the other hand, in the basic configuration illustrated in FIGS. 14 and 16, the transformation device 1001 need not receive the class labels.

Next, the divider 1002 of the transformation device 1001 randomly divides the plurality of training vectors $v_1$, $v_2, \ldots, v_N$ into a plurality of groups $G_1, G_2, \ldots, G_M$ (Step S2002). This classification can be expressed by respectively giving to the training vectors $v_1, v_2, \ldots, v_N$ the random labels (group labels) g(1), g(2), . . . , g(N) that correspond to the subscripts of the groups into which the training vectors are divided. The number M of the groups may be any number not smaller than 2.

To facilitate the reader's understanding, it is assumed below that, for each integer i=1, 2, . . . , N, the training vector $v_i$ is classified into the group $G_{g(i)}$ (the label g(i) is added to the training vector $v_i$). In other words, the following relation stands:

$$v_1 \in G_{g(1)}, v_2 \in G_{g(2)}, \ldots, v_N \in G_{g(N)}.$$

Further, in an omissible configuration, it is assumed that the training vector $v_i$ belongs to the class $C_{c(i)}$ (the correct label c(i) is added to the training vector $v_i$). In other words, the following relation stands:

$$v_1 \in C_{c(1)}, v_2 \in C_{c(2)}, \ldots, v_N \in C_{c(N)}.$$

The transformation device 1001 transforms an input vector x given thereto into a feature vector p(x) according to the transformation model 1101. As the transformation model 1101, various models can be used such as a convolutional neural network (CNN) as well as a discretionarily selected non-convolutional neural network.

The first classifier 1003 classifies the feature vector p(x) transformed from the input vector x given to the transformation device 1001 to one of the plurality of groups $G_1$, $G_2, \ldots, G_M$ according to the first classification model 1201. In substantial terms, the first classifier 1003 outputs for the feature vector p(x) given thereto the subscript (label) of the group into which the feature vector p(x) should be classified. Generally used logistic regression as well as ridge regression, lasso regression, a support vector machine (SVM), random forests, a neural network, and the like may be used for the first classification model.

The first learner 1004 of the transformation device 1001 then generates a first training dataset ($v_1$, g(1)), ($v_2$, g(2)),

. . . , ($v_N$, g(N)), which includes a plurality of training vectors and the groups into which the plurality of training vectors is respectively divided (Step S2003). The first training dataset associates each training vector with a random label (group label).

The first learner 1004 of the transformation device 1001 then learns the transformation model 1101 for the transformation device 1001 and the first classification model 1201 for the first classifier 1003 by using the first training dataset (Step S2004).

Thus the learning of the transformation model 1101 for the transformation device 1001 is performed. After that, when given an input vector x, the transformation device 1001 outputs the feature vector p(x).

As mentioned above, the description below concerns a configuration omitted in FIG. 14. Therefore, FIG. 15 will be referred to as appropriate in the description. That is, in this configuration, each of the plurality of training vectors $v_1$, $v_2, \ldots, v_N$ belongs to one of the plurality of classes $C_1$, $C_2, \ldots, C_L$.

The stage of learning classification will be described below, in which, for the input vector given to the transformation device 1001, the class to which the input vector should belong is outputted.

Here, the second classifier 1005 classifies the feature vector p(x) transformed from the input vector x given to the transformation device 1001 to one of the plurality of classes $C_1, C_2, \ldots, C_L$ according to the second classification model 1202. In substantial terms, the second classifier 1005 outputs for the feature vector p(x) given thereto the subscript (class label) of the class into which the feature vector p(x) should be classified. As in the case of the first classification model 1201, generally used logistic regression as well as ridge regression, lasso regression, a support vector machine (SVM), random forests, a neural network, and the like may be used for the second classification model 1202. Further, a neural network of the same structure can be used for the first classification model 1201 and the second classification model 1202.

Here, the second learner 1006 of the transformation device 1001 generates a second training dataset ($p(v_1)$, c(1)), ($p(v_2)$, c(2)),

. . . , ($p(v_N)$, c(N)), which includes the feature vectors, respectively transformed from the plurality of training vectors by the transformation device 1001 according to the transformation model 1101 learned by the first learner 1004, and the classes to which the plurality of training vectors respectively belong (Step S2005). In the learning of the transformation model 1101 and the first classification model 1201 in Step S2004, the training vectors are transformed to the feature vectors. Therefore, the feature vectors $p(v_i)$ transformed from the training vectors $v_i$ (i=1, 2, . . . , N) according to the already learned transformation model 1101 are already calculated in the processing in Step S2004. Here, the already calculated feature vectors $p(v_i)$ and the correct labels c(i) added to the original training vectors $v_i$ are used as the second training dataset.

The second learner 1006 learns the second classification model 1202 for the second classifier 1005 (Step S2006).

The transformation device 1001 according to the present embodiment is characteristic in that the second classification model 1202 is updated during the learning by the second learner 1006 but the transformation model 1101 is not. Note that ($v_1$, c(1)), ($v_2$, c(2)),

. . . , ($v_N$, c(N))

can be used as the second training dataset. In this case, the second classification model 1202 may be updated without updating the transformation model 1101 already learned for the transformation device 1001.

After the second classification model 1202 has been learned, comes the step of using the classification. That is, when a new input vector y is given to the transformation device 1001 (Step S2007), the transformation device 1001 transforms the new input vector y to a new feature vector p(y) according to the learned transformation model 1101 (Step S2008), the second classifier 1005 calculates the label for the new feature vector p(y) according to the learned second classification model 1202 and thereby classifies the feature vector p(y) into one of the plurality of classes $C_1, C_2, \ldots, C_L$ (Step S2009).

In other words, the input vector y is classified into the class into which the feature vector p(y) is classified.

Note that the stage of using the classification (Steps S2007-S2009) is executed only once but this stage can be executed any number of times, every time an input vector is given.

As illustrated in FIG. 16, the component of classification can be omitted by learning the transformation model in Steps S2001-S2004 and transforming the input vector to a feature vector in Steps S2007-S2008. In this case also, the transformation to a feature vector may be executed any number of times.

From the experiments by the inventor, it is known that the classification by the transformation device 1001 according to the present embodiment improves accuracy and sparsity of the feature vectors, compared with the classification by a conventional autoencoder, using $(v_1, c(1))$, $(v_2, c(2))$,

. . . , $(v_N, c(N))$ as the training dataset.

While the conventional autoencoder may cause overfitting to the training data set, the transformation device 1001 according to the present embodiment does not refer to the training data set when learning the transformation model 1101 and, presumably, overfitting is curtailed thereby.

Various cases of the transformation model 1101 will be described below. The transformation model 1101 is for transforming an input vector to a feature vector and compressing information. Hence, in general, the dimensionality of the input vector is lower than that of the feature vector.

Similarly, for the transformation device 1001 also, a transformation model 1101 in which the transformation to the feature vector is performed by reducing the dimensionality of the input vector can be employed. The dimensionality of the feature vector is preferably not smaller than the number of kinds of the random labels, in other words, not smaller than the number M of the groups.

Further, in a case in which the input vectors are classified into classes, the dimensionality of the feature vector is preferably not smaller than the number of kinds of the correct labels, in other words, not smaller than the number L of the classes.

As for the relative magnitude of the number M of kinds of the random labels and the number L of the kinds of the correct labels, performance differs depending on the target. In this case, appropriate parameters can be determined based on prior experiments.

In addition, the probabilities that the divider 1002 randomly divides training vectors into each of the plurality of groups may be the same or different between the groups. In other words, the number of training vectors included in each group may be equal to or different from each other. In this case also, an appropriate allocation of probabilities can be determined also on the basis of prior experiments.

On the other hand, it is known that the transformation device 1001 has a good sparsity of the feature vectors. Thus, the transformation to the feature vector may be performed by increasing the dimensionality of the input vector. In other words, the dimensionality of the feature vector is greater than that of the input vector.

The transformation device 1001 according to the present embodiment can be widely used for substituting an autoencoder that was conventionally used to obtain a feature vector.

Note that an autoencoder reduces the dimensionality of the input vector in the encoder in the first part to obtain the feature vector and then increases the dimensionality of the feature vector in the decoder in the second part to obtain the output vector and performs learning for reducing the difference between the input vector and the output vector. Thus, when the transformation device 1001 according to the present embodiment is applied to a case in which dimensionality reduction is performed by the encoder of an autoencoder, the filter configuration of the encoder as it is can be used for the transformation model 1101 of the transformation device 1001.

Exemplary Experiments of Transformation Device

With CIFAR-10, which includes photographs of things classified into 10 classes, experiments were conducted to compare an autoencoder and the transformation device 1001 according to the present embodiment.

As the input images were color images of 32 pixels×32 pixels×RGB 3 layers and hence the input vectors were in 3,072 dimensions.

The filter configuration of the transformation device 1001 was as follows.

input_img=Input((x_train.shape[1], x_train.shape[2], x_train.shape[3]));

x1=Conv2D(8, (2,2), strides=(2,2), activation='relu', padding='same')(input_img);

encoded=Flatten( )(x1);

x2=Reshape((16,16,8), input_shape=(2048,))(encoded);

x3=Conv2D(8, (2,2), strides=(2,2), activation='relu', padding='same')(x2);

x4=Flatten( )(x3);

last=Dense(L, activation='softmax')(x4);

The transformation device 1001 in the present experiment compressed the input vector to 2,048 dimensions (encoded) to obtain the feature vector, by the simplest CNN with eight output layers, a kernel size and stride of 2×2, the activation function relu, no pooling, and no dropout. In other words, the lines up to "encoded" above corresponded to the transformation model.

The obtained feature vector was reshaped in two dimensions (x2), passed through the simplest CNN with eight output layers, a kernel size and stride of 2×2, the activation function relu, no pooling, and no dropout (x3), then fully connected and, by using the activation function softmax, classified into L kinds of groups (last). In other words, the lines from "encoded" via "x3" and "x4" to "last" corresponded to the first classification model 1201.

In the present experiment, 2,048-dimensional feature vectors were classified into 10 classes, using common logistic regression, as the second classification model 1202.

The filter configuration of the conventional autoencoder was the same as the transformation model of the transformation device 1001 and the filter configuration of the decoder was a reverse thereof. After the learning of the autoencoder had been completed, the learning of logistic regression was performed for classifying the feature vectors.

The training data set consisted of 50,000 examples and the input data of 10,000 examples were given after the learning had been completed. Accuracy of determination of the feature vectors, sparsity, and time spent for learning logistic regression for classifying the feature vectors were measured (average of 100 trials).

The following result was observed for the autoencoder:

Accuracy of determination: 38.2%

Ratio of zero components in the feature vectors: 11.8%

Time spent for learning logistic regression: 6745.6 seconds.

The following result was observed for the transformation device 1001, where the number of kinds of the random labels, in other words, the number M of groups was 2, and the feature vectors were divided into two groups of equal size (25,000 each):

Accuracy of determination: 44.8%

Ratio of zero components in the feature vectors: 55.1%

Time spent for learning logistic regression: 643.1 seconds.

The following result was observed for the transformation device 1001, where the number M of groups is 2, and the feature vectors were divided into two groups of different sizes (10,000 and 40,000 components):

Accuracy of determination: 44.7%

Ratio of zero components in the feature vectors: 59.7%

Time spent for learning logistic regression: 378.8 seconds.

The following result was observed for the transformation device 1001, where the number L of groups is 10, and the feature vectors were divided into 10 groups of different sizes (2,500, 3,000, 3,500, 4,000, 4,500, 5,550, 6,000, 6,500, 7,000, and 7,500 components):

Accuracy of determination: 45.2%

Ratio of zero components in the feature vectors: 49.7%

Time spent for learning logistic regression: 798.4 seconds.

As seen from the above-described results, the transformation device 1001 according to the present embodiment is superior in sparsity of feature vectors and in accuracy of determination based on the obtained feature vectors. Further, the transformation device 1001 according to the present embodiment spends a very short time for learning logistic regression since the obtained feature vectors are sparse.

Thus the experiments with CIFAR-10 confirmed the performance of the transformation device 1001 according to the present embodiment.

Experiments were also conducted in a similar conditions for the case in which the above-described transformation device 1001 was applied to the classification device 101. That is, a comparison was made between the classification device 101 that uses the above-described autoencoder (the encoder is up to the filter on the second tier in FIGS. 2A and 2B) and the classification device 1001 that uses the transformation device 1001 that has the same filter configuration as the encoder and performs unsupervised learning using random labels. The number of groups (the number of kinds of the labels) L=2.

According to the experiments, the use of the classification device 1001 resulted in an increase in the ratio of zero components in the compressed vectors (feature vectors) from 45% to 55% and the AUC improved by 0.023. The calculation time spent for dimensionality reduction was one third. Thus, the usefulness of the transformation device 1001 with respect to complicated images such as pathology images was confirmed.

Other Exemplary Applications

In the above-described experiments, pathology photographs of the target sites of prostate cancer patients were used as learning photographs and determination photographs, and classification to groups was made as to whether or not there was a recurrence within one year after the photograph was taken. However, the areas in which the present embodiment can be applied are not limited to this. In other words, the present embodiment can be applied for other purposes because, as long as learning photographs and determination photographs are prepared and the learning photographs have been classified, the present embodiment allows automatic group classification of the determination photographs.

For example, the present embodiment can be applied for determining the condition of an antique kimono. That is, based on the extent of deterioration of antique kimonos for learning, the photographs (learning photographs) are classified into groups and the classification device 101 learns the classification. After the learning is completed, a photograph of an antique kimono to be examined (determination photograph) is given to the classification device 101 and a group is inferred according to the degree of deterioration of the antique kimono.

Conspicuous damages like moth holes of an antique kimono can be determined by humans but it is often the case that the material of parts with no such conspicuous damage has deteriorated. Such deterioration is recognized with a sensory expression, for example, "inferior texture" and distinguished only by the so-called cognoscenti. The classification device 101 according to the present embodiment, however, allows automatic classification of "an extent of texture deterioration" like this.

Apart from this, final inspections of industrial products are often conducted by skilled workers and the present embodiment can be applied also to such inspections.

Further, the present embodiment can be applied also to analyses of aerial photographs and photographs of celestial bodies. For example, the present embodiment can be applied for detecting a meteor swarm, a meteorite, or a sign of supernova explosion from photographs of celestial bodies as well as for detecting the existence of underground resources such as coal, petroleum, water, metal ore and underground installations such as ruins and relics.

Conclusion

As described above, a classification device according to the present embodiment of the disclosure includes:

an acquirer that acquires a plurality of learning images $S_{i,1}$, $S_{i,2}$, . . . , which are obtained by dividing each learning photograph $S_i$ of a plurality of learning photographs $S_1$, $S_2$, . . . , the acquirer associating the plurality of learning images with a group $G_{z(i)}$ to which a learning target captured on each learning photograph $S_i$ belongs among a plurality of groups $G_1, G_2, \ldots, G_L$;

a first learner that learns a first model for calculating a plurality of compressed vectors $v_{1,1}, v_{1,2}, \ldots,$ $v_{2,1}, v_{2,2}, \ldots,$ $\ldots,$ obtained by dimensionality reduction from the plurality of acquired learning images $S_{1,1}, S_{1,2}, \ldots,$ $S_{2,1}, S_{2,2}, \ldots,$ $\ldots,$ a class $C_{y(i,j)}$ among a plurality of classes $C_1, C_2, \ldots, C_M$, wherein each learning image $S_{i,j}$ of the plurality of learning images and each compressed vector $v_{i,j}$ of the plurality of compressed vectors are classified into the class $C_{y(i,j)}$, and a plurality of M-dimensional score vectors $u_{i,j}$, which represent a nearness of each compressed vector $v_{i,j}$ to each of the plurality of classes;

an associator that calculates an M-dimensional representative degree vector $r_h$ that represents the degree to which each of the plurality of classes $C_1, C_2, \ldots, C_M$ represents each group $G_h$ of the plurality of groups $G_1, G_2, \ldots, G_L$ from one or more score vectors $u_{i,j|z(i)=h}$ calculated for one or more compressed vectors $v_{i,j|x(i)=h}$ associated with each group $G_h$, and associates each class $C_k$ of the plurality of classes with a group $G_{x(k)}$ from among the plurality of groups $G_1, G_2, \ldots, G_L$ and another group $G_0$ based on the calculated representative degree vectors $r_1, r_2, \ldots, r_L$;

a receiver that receives a plurality of determination images obtained by dividing a determination photograph on which a determination target is captured; and an identifier that classifies each of the received plurality of determination images to one of the plurality of classes, using the learned first model, and identifies the group associated with the class into which the image is classified.

The classification device according to the present embodiment may further include:

a second learner that learns a second model with which the learning target captured on each learning photograph $S_i$ is assigned to one of the plurality of groups $G_1, G_2, \ldots, G_L$, based on a distribution of groups $G_{x(y'(i,1))}, G_{x(y'(i,2))}, \ldots$, which are associated with classes $C_{y'(i,1)}, C_{y'(i,2)}, \ldots$ into which compressed vectors $v_{i,1}, v_{i,2}, \ldots$ are classified; and an inferrer that infers to which group among the plurality of groups $G_1, G_2, \ldots, G_L$ the determination target belongs, using the learned second model, based on a distribution of the groups identified for the determination target.

The classification device according to the present embodiment may further include:

a second learner that learns a second model for calculating a probability that a learning target captured on each learning photograph $S_i$ is assigned to each of the plurality of groups $G_1, G_2, \ldots, G_L$ from the score vectors $u_{i,1}, u_{i,2}, \ldots$ and groups $G_{x(1)}, G_{x(2)}, \ldots$ with which each of the plurality of classes $C_1, C_2, \ldots, C_M$ is associated; and an inferrer that infers a probability that the determination target belongs to each group of the plurality of groups $G_1, G_2, \ldots, G_L$, based on the calculated score vectors for the plurality of determination images, using the learned second model.

In the classification device according to the present embodiment, in the first model, the plurality of compressed vectors may be obtained by using an autoencoder and the plurality of compressed vectors may be classified by clustering the plurality of compressed vectors.

In the classification device according to the present embodiment, the autoencoder may be a convolutional autoencoder, sparse autoencoder, deep autoencoder, denoising autoencoder, contractive autoencoder, saturating autoencoder, nonparametrically guided autoencoder, or a combination thereof.

In the classification device according to the present embodiment, the plurality of compressed vectors may be M-dimensional vectors, and it may be that $y(i,j)=k$ wherein a maximum component of each compressed vector $v_{i,j}$ is a k-th component thereof.

In the classification device according to the present embodiment, the clustering may be K-means, K-means++, affinity propagation, mean-shift, spectral clustering, Ward hierarchical clustering, agglomerative clustering, DBSCAN, Gaussian mixtures, BIRCH, principal component analysis, or a combination thereof.

In the classification device according to the present embodiment, the score vectors $u_{i,j}$ may be vectors of which a component corresponding to the class $C_{y(i,j)}$ is 1 and other components are 0.

In the classification device according to the present embodiment, the score vectors $u_{i,j}$ may be vectors of which a component corresponding to each class $C_k$ is a proximity of the compressed vector $v_{i,j}$ to a representative point of each class $C_k$.

In the classification device according to the present embodiment, the plurality of compressed vectors may be M-dimensional vectors, the score vectors $u_{i,j}$ may be calculated by applying so max to each compressed vector $v_{i,j}$, and it may be that $y(i,j)=k$ wherein a maximum component of each score vector $u_{i,j}$ is a k-th component thereof.

In the classification device according to the present embodiment, the representative degree vector $r_h$ may be calculated by $$r_h = \Sigma_{i,j|z(i)=h} u_{i,j}.$$

In the classification device according to the present embodiment, for each class $C_k$ of the plurality of classes $C_1, C_2, \ldots, C_M$, it may be that $$x(k)=h$$

when a maximum value $r_{h,k}$ of k-th components $r_{1,k}, r_{2,k}, \ldots, r_{L,k}$ respectively of the representative degree vectors $r_1, r_2, \ldots, r_L$ is an outlier to a distribution of other components $r_{1,k}, r_{2,k}, \ldots, r_{L,k}$ other than the maximum value $r_{h,k}$, and otherwise, $$x(k)=0.$$

In the classification device according to the present embodiment, the maximum value $r_{h,k}$ may be regarded as the outlier when the maximum value $r_{h,k}$ exceeds a threshold value defined by multiplying a summation of $r_{1,k}, r_{2,k}, \ldots, r_{L,k}$ by a constant not smaller than 0.5 and not greater than 1.

In the classification device according to the present embodiment, the maximum value $r_{h,k}$ may be regarded as the outlier when $r_{h,k}$ exceeds a threshold value defined at a level of significance from the distribution.

In the classification device according to the present embodiment, in the second model, an inputted target may be classified into one of the plurality of groups $G_1, G_2, \ldots, G_L$ by a support vector machine, logistic regression, ridge regression, lasso regression, a neural network, or random forests.

In the classification device according to the present embodiment, the classification device newly gives the acquirer the learning images classified into a class $C_{k|x(k)=h}$ associated with each group $G_h$ of the plurality of groups $G_1, G_2, \ldots, G_L$ and the group $G_h$ as the learning photograph and the group to which the learning target belong, newly executes
    division, association, and acquisition by the acquirer,
    learning by the first learner,
    association by the associator,
    learning by the second learner, and
    inference by the inferrer,
calculates a distribution of groups to which it is newly
    inferred that the learning images classified into each
    class $C_k$ belong, and
changes the association of the class $C_k$ from the group $G_h$
    to the group $G_0$ when the group $G_h$ is not at a certain
    high rank in the calculated distribution.

In the classification device according to the present embodiment, the association of the class $C_k$ may be changed from the group $G_h$ to the other group $G_0$ when the group $G_h$ is not at a highest rank in the calculated distribution.

In the classification device according to the present embodiment,
    in the first model,
    by calculating the plurality of compressed vectors with a
        transformation device that transforms an input vector to
        a feature vector using a transformation model, and by
        clustering the calculated plurality of compressed vec-
        tors, the plurality of compressed vectors may be clas-
        sified, and
    the transformation device may include:
        a divider that randomly divides a plurality of training
            vectors into a plurality of groups;
        a first classifier that classifies a feature vector trans-
            formed from each of the plurality of training vectors,
            using the transformation model, to one of the plu-
            rality of groups, using a first classification model;
            and
        a first learner that learns the transformation model and
            the first classification model, using a first training
            dataset which comprises the plurality of training
            vectors and groups into which the plurality of train-
            ing vectors is respectively divided.

A transformation device according to the present embodiment may be a transformation device in the above-described classification device.

A method of classification according to the present embodiment of the disclosure includes the steps, performed by a classification device, of:
    acquiring a plurality of learning images $S_{i,1}$, $S_{i,2}$, . . . ,
        which are obtained by dividing each learning photo-
        graph $S_i$ of a plurality of learning photographs $S_1$,
        $S_2$, . . . , associating the plurality of learning images
        with a group $G_{z(i)}$ to which a learning target captured on
        each learning photograph $S_i$ belongs among a plurality
        of groups $G_1$, $G_2$, . . . , $G_L$;
    learning a first model for calculating a plurality of com-
        pressed vectors
        $v_{1,1}$, $v_{1,2}$, . . . ,
        $v_{2,1}$, $v_{2,2}$, . . . ,
        . . . ,
obtained by dimensionality reduction from the plurality of acquired learning images
    $S_{1,1}$, $S_{1,2}$, . . . ,
    $S_{2,1}$, $S_{2,2}$, . . . ,
    . . . ,
a class $C_{y(i,j)}$ among a plurality of classes $C_1$, $C_2$, . . . , $C_M$, wherein each learning image $S_{i,j}$ of the plurality of learning images and each compressed vector $v_{i,j}$ of the plurality of compressed vectors are classified into the class $C_{y(i,j)}$, and a plurality of M-dimensional score vectors $u_{i,j}$, which repre- sent a nearness of each compressed vector $v_{i,j}$ to each of the plurality of classes;
    calculating an M-dimensional representative degree vec-
        tor $r_h$ that represents the degree to which each of the
        plurality of classes $C_1$, $C_2$, . . . , $C_M$ represents each
        group $G_h$ of the plurality of groups $G_1$, $G_2$, . . . , $G_L$ from
        one or more score vectors $u_{i,j|z(i)=h}$ calculated for one or
        more compressed vectors $v_{i,j|z(i)=h}$ associated with each
        group $G_h$, and associating each class $C_k$ of the plurality
        of classes with a group $G_{x(k)}$ from among the plurality
        of groups $G_1$, $G_2$, . . . , $G_L$ and another group $G_0$ based
        on the calculated representative degree vectors $r_1$,
        $r_2$, . . . , $r_L$;
    receiving a plurality of determination images obtained by
        dividing a determination photograph on which a deter-
        mination target is captured; and
    classifying each of the received plurality of determination
        images to one of the plurality of classes, using the
        learned first model, and identifying the group associ-
        ated with the class into which the image is classified.

A program according to the present embodiment of the disclosure causes a computer to function as:
    an acquirer that acquires a plurality of learning images
        $S_{i,1}$, $S_{i,2}$, . . . , which are obtained by dividing each
        learning photograph $S_i$ of a plurality of learning pho-
        tographs $S_1$, $S_2$, . . . , the acquirer associating the
        plurality of learning images with a group $G_{z(i)}$ to which
        a learning target captured on each learning photograph
        $S_i$ belongs among a plurality of groups $G_1$, $G_2$, . . . , $G_L$;
    a first learner that learns a first model for calculating a
        plurality of compressed vectors
        $v_{1,1}$, $v_{1,2}$, . . . ,
        $v_{2,1}$, $v_{2,2}$, . . . ,
        . . . ,
obtained by dimensionality reduction from the plurality of acquired learning images
    $S_{1,1}$, $S_{1,2}$, . . . ,
    $S_{2,1}$, $S_{2,2}$, . . . ,
    . . . ,
a class $C_{y(i,j)}$ among a plurality of classes $C_1$, $C_2$, . . . , $C_M$, wherein each learning image $S_{i,j}$ of the plurality of learning images and each compressed vector $v_{i,j}$ of the plurality of compressed vectors are classified into the class $C_{y(i,j)}$, and a plurality of M-dimensional score vectors $u_{i,j}$, which repre- sent a nearness of each compressed vector $v_{i,j}$ to each of the plurality of classes;
    an associator that calculates an M-dimensional represen-
        tative degree vector $r_h$ that represents the degree to
        which each of the plurality of classes $C_1$, $C_2$, . . . , $C_M$
        represents each group $G_h$ of the plurality of groups $G_1$,
        $G_2$, . . . , $G_L$ from one or more score vectors $u_{i,j|z(i)=h}$
        calculated for one or more compressed vectors $v_{i,j|z(i)=h}$
        associated with each group $G_h$, and associates each
        class $C_k$ of the plurality of classes with a group $G_{x(k)}$
        from among the plurality of groups $G_1$, $G_2$, . . . , $G_L$ and
        another group $G_0$ based on the calculated representative
        degree vectors $r_1$, $r_2$, . . . , $r_L$;
    a receiver that receives a plurality of determination
        images obtained by dividing a determination photo-
        graph on which a determination target is captured; and
    an identifier that classifies each of the received plurality of
        determination images to one of the plurality of classes,
        using the learned first model, and identifies the group
        associated with the class into which the image is
        classified.

The program according to the present embodiment may be stored on a non-transitory computer-readable information recording medium to be distributed and sold. The program may also be distributed and sold via a transitory transmission medium, such as a computer communication network.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

This application claims the benefit of Japanese Patent Application No. 2018-181008, filed on Wednesday, Sep. 26, 2018, the entire disclosure of which is incorporated by reference herein.

INDUSTRIAL APPLICABILITY

According to the present disclosure, it is possible to provide a classification device, a classification method, a program, and a non-transitory information recording medium to classify an image by identifying, on a photograph on which a target belonging to one of a plurality of groups is captured, a portion that characterizes a single group.

REFERENCE SIGNS LIST

101 Classification device
102 Acquirer
103 First learner
104 Associator
105 Receiver
106 Identifier
107 Second learner
108 Inferrer
109 Changer
1001 Transformation device
1002 Divider
1003 First classifier
1004 First learner
1005 Second classifier
1006 Second learner
1101 Transformation model
1201 First classification model
1202 Second classification model

What is claimed is:

1. A classification device comprising a memory that stores program code and one or more processors configured to read the program code and operate as instructed by the program code including:

an acquirer code configured to cause the one or more processors to acquire a plurality of learning images $S_{i,1}$, $S_{i,2}$, . . . , which is obtained by dividing each learning photograph $S_i$ of a plurality of learning photographs $S_1$, $S_2$, . . . , and associate the plurality of learning images with a group $G_{z(i)}$ to which a learning target captured on each learning photograph $S_i$ belongs among a plurality of groups $G_1$, $G_2$, . . . , $G_L$;

a first learner code configured to case the one or more processors to learn a first model for calculating a plurality of compressed vectors $v_{1,1}$, $v_{1,2}$, . . . , $v_{2,1}$, $v_{2,2}$, . . . ,

. . . , obtained by dimensionality reduction from the plurality of acquired learning images $S_{1,1}$, $S_{1,2}$, . . . , $S_{2,1}$, $S_{2,2}$, . . . ,

. . . , a class $C_{y(i,j)}$ among a plurality of classes $C_1$, $C_2$, . . . , $C_M$, wherein each learning image $S_{i,j}$ of the plurality of learning images and each compressed vector $v_{i,j}$ of the plurality of compressed vectors are classified into the class $C_{y(i,j)}$, and a plurality of M-dimensional score vectors $u_{i,j}$, which represent a nearness of each compressed vector $v_{i,j}$ to each of the plurality of classes;

an associator code configured to cause the one or more processors to calculate an M-dimensional representative degree vector n that represents the degree to which each of the plurality of classes $C_1$, $C_2$, . . . , $C_M$ represents each group $G_h$ of the plurality of groups $G_1$, $G_2$, . . . , $G_L$ from one or more score vectors $u_{i,j|z(i)=h}$ calculated for one or more compressed vectors $v_{i,j|z(i)=h}$ associated with each group $G_h$, and associates each class $C_k$ of the plurality of classes with a group $G_{x(k)}$ from among the plurality of groups $G_1$, $G_2$, . . . , $G_L$ and another group $G_0$ based on the calculated representative degree vectors $r_1$, $r_2$, . . . , $r_L$;

a receiver code configured to cause the one or more processors to receive a plurality of determination images obtained by dividing a determination photograph on which a determination target is captured; and an identifier code configured to cause the one or more processors to classify each of the received plurality of determination images to one of the plurality of classes, using the learned first model, and identifies the group associated with the class into which the image is classified.

2. The classification device according to claim 1, the program code further comprising:

a second learner code configured to cause the one or more processors to learn a second model with which the learning target captured on each learning photograph $S_i$ is assigned to one of the plurality of groups $G_1$, $G_2$, . . . , $G_L$, based on a distribution of groups $G_{x(y(i,1))}$, $G_{x(y(i,2))}$, . . . , which are associated with classes $C_{y(i,1)}$, $C_{y(i,2)}$, . . . into which compressed vectors $v_{i,1}$, $v_{i,2}$, . . . are classified; and an inferrer code configured to cause the one or more processors to infer to which group among the plurality of groups $G_1$, $G_2$, . . . , $G_L$ the determination target belongs, using the learned second model, based on a distribution of the groups identified for the determination target.

3. The classification device according to claim 1, further the program code comprising:

a second learner code configured to cause the one or more processors to learn a second model for calculating a probability that a learning target captured on each learning photograph $S_i$ is assigned to each of the plurality of groups $G_1$, $G_2$, . . . , $G_L$ from the score vectors $u_{i,1}$, $u_{i,2}$, . . . and groups $G_{x(1)}$, $G_{x(2)}$ . . . with which each of the plurality of classes $C_1$, $C_2$, . . . , $C_M$ is associated; and an inferrer code configured to cause the one or more processors to infer a probability that the determination target belongs to each group of the plurality of groups $G_1, G_2, \ldots, G_L$, based on the calculated score vectors for the plurality of determination images, using the learned second model.

4. The classification device according to claim 1, wherein, in the first model, the plurality of compressed vectors is obtained by using an autoencoder and the plurality of compressed vectors is classified by clustering the plurality of compressed vectors.

5. The classification device according to claim 4, wherein the autoencoder is a convolutional autoencoder, sparse autoencoder, deep autoencoder, denoising autoencoder, contractive autoencoder, saturating autoencoder, nonparametrically guided autoencoder, or a combination thereof.

6. The classification device according to claim 4, wherein the plurality of compressed vectors are M-dimensional vectors, and $y(i,j)=k$ wherein a maximum component of each compressed vector $v_{i,j}$ is a k-th component thereof.

7. The classification device according to claim 4, wherein the clustering is K-means, K-means++, affinity propagation, mean-shift, spectral clustering, Ward hierarchical clustering, agglomerative clustering, DBSCAN, Gaussian mixtures, BIRCH, principal component analysis, or a combination thereof.

8. The classification device according to claim 6, wherein the score vectors $u_{i,j}$ are vectors of which a component corresponding to the class $C_{y(i,j)}$ is 1 and other components are 0.

9. The classification device according to claim 6, wherein the score vectors $u_{i,j}$ are vectors of which a component corresponding to each class $C_k$ is a proximity of the compressed vector $v_{i,j}$ to a representative point of each class $C_k$.

10. The classification device according to claim 4, wherein the plurality of compressed vectors are M-dimensional vectors, the score vectors $u_{i,j}$ are calculated by applying softmax to each compressed vector $v_{i,j}$, and $y(i,j)=k$ wherein a maximum component of each score vector $u_{i,j}$ is a k-th component thereof.

11. The classification device according to claim 6, wherein the representative degree vector $r_h$ is calculated by $$r_h = \Sigma_{i,j|z(i)=h} u_{i,j}.$$

12. The classification device according to claim 11, wherein, for each class $C_k$ of the plurality of classes $C_1, C_2, \ldots, C_M$, $x(k)=h$ when a maximum value $r_{h,k}$ of k-th components $r_{1,k}, r_{2,k}, \ldots, r_{L,k}$ respectively of the representative degree vectors $r_1, r_2, \ldots, r_L$ is an outlier to a distribution of other components $r_{1,k}, r_{2,k}, \ldots, r_{L,k}$ other than the maximum value $r_{h,k}$, and otherwise, $x(k)=0.$

13. The classification device according to claim 12, wherein the maximum value $r_{h,k}$ is regarded as the outlier when the maximum value $r_{h,k}$ exceeds a threshold value defined by multiplying a summation of $r_{1,k}, r_{2,k}, \ldots, r_{L,k}$ by a constant not smaller than 0.5 and not greater than 1.

14. The classification device according to claim 13, wherein the maximum value $r_{h,k}$ is regarded as the outlier when $r_{h,k}$ exceeds a threshold value defined at a level of significance from the distribution.

15. The classification device according to claim 2, wherein, in the second model, an inputted target is classified into one of the plurality of groups $G_1, G_2, \ldots, G_L$ by a support vector machine, logistic regression, ridge regression, lasso regression, a neural network, or random forests.

16. The classification device according to claim 2, wherein the classification device newly acquires the learning images classified into a class $C_{k|x(k)=h}$ associated with each group $G_h$ of the plurality of groups $G_1, G_2, \ldots, G_L$ and the group $G_h$ as the learning photograph and the group to which the learning target belong, newly executes division, association, and acquisition by the acquirer, learning by the first learner, association by the associator, learning by the second learner, and inference by the inferrer, calculates a distribution of groups to which it is newly inferred that the learning images classified into each class $C_k$ belong, and changes the association of the class $C_k$ from the group $G_h$ to the group $G_0$ when the group $G_h$ is not at a certain high rank in the calculated distribution.

17. The classification device according to claim 16, wherein the association of the class $C_k$ is changed from the group $G_h$ to the other group $G_0$ when the group $G_h$ is not at a highest rank in the calculated distribution.

18. The classification device according to claim 1, wherein, in the first model, by calculating the plurality of compressed vectors with a transformation device that transforms an input vector to a feature vector using a transformation model, and by clustering the calculated plurality of compressed vectors, the plurality of compressed vectors is classified, and the transformation device comprises:

a divider that randomly divides a plurality of training vectors into a plurality of groups;

a first classifier that classifies a feature vector transformed from each of the plurality of training vectors, using the transformation model, to one of the plurality of groups, using a first classification model; and a first learner that learns the transformation model and the first classification model, using a first training dataset which comprises the plurality of training vectors and groups into which the plurality of training vectors is respectively divided.

19. The classification device according to claim 18, wherein a transformation device in the classification device.

20. A method of classification performed by a classification device comprising a memory that stores program code and one or more processors configured to read the program code and operate as instructed by the program code including a acquirer code, a learner code, an associator code, a receiver code, and an identifier code, the method comprising the steps of:

acquiring, with the one or more processors instructed by the acquirer code a plurality of learning images $S_{i,1}, S_{i,2}, \ldots$, which are obtained by dividing each learning photograph $S_i$ of a plurality of learning photographs $S_1, S_2, \ldots$, associating the plurality of learning images with a group $G_{z(i)}$ to which a learning target captured on each learning photograph $S_i$ belongs among a plurality of groups $G_1, G_2, \ldots, G_L$;

learning, with the one or more processors instructed by the learner code, a first model for calculating a plurality of compressed vectors $v_{1,1}$, $v_{1,2}$, . . . , $v_{2,1}$, $v_{2,2}$, . . . ,

. . . , obtained by dimensionality reduction from the plurality of acquired learning images $S_{1,1}$, $S_{1,2}$, . . . , $S_{2,1}$, $S_{2,2}$, . . . ,

. . . , a class $C_{y(i,j)}$ among a plurality of classes $C_1$, $C_2$, . . . , $C_M$, wherein each learning image $S_{i,j}$ of the plurality of learning images and each compressed vector $v_{i,j}$ of the plurality of compressed vectors are classified into the class $C_{y(i,j)}$, and a plurality of M-dimensional score vectors $u_{i,j}$, which represent a nearness of each compressed vector $v_{i,j}$ to each of the plurality of classes;

calculating, with the one or more processors instructed by the associator code, an M-dimensional representative degree vector m that represents the degree to which each of the plurality of classes $C_1$, $C_2$, . . . , $C_M$ represents each group $G_h$ of the plurality of groups $G_1$, $G_2$, . . . , $G_L$ from one or more score vectors $u_{i,j|z(i)=h}$ calculated for one or more compressed vectors $v_{i,j|z(i)=h}$ associated with each group $G_h$, and associating each class $C_k$ of the plurality of classes with a group $G_{x(k)}$ from among the plurality of groups $G_1$, $G_2$, . . . , $G_L$ and another group $G_0$ based on the calculated representative degree vectors $r_1$, $r_2$, . . . , $r_L$;

receiving, with the one or more processors instructed by the receive code, a plurality of determination images obtained by dividing a determination photograph on which a determination target is captured; and classifying, with the one or more processors instructed by the classifier code, each of the received plurality of determination images to one of the plurality of classes, using the learned first model, and identifying the group associated with the class into which the image is classified.

21. A non-transitory computer-readable information recording medium storing a program causing a computer including one or more processors to read the program and operate as instructed by the program, the program including:

an acquirer code configured to cause the one or more processors to acquire a plurality of learning images $S_{i,1}$, $S_{i,2}$, . . . , which is obtained by dividing each learning photograph $S_i$ of a plurality of learning photographs $S_1$, $S_2$, . . . , and associate the plurality of learning images with a group $G_{z(i)}$ to which a learning target captured on each learning photograph $S_i$ belongs among a plurality of groups $G_1$, $G_2$, . . . , $G_L$;

a first learner code configured to case the one or more processors to learn a first model for calculating a plurality of compressed vectors $v_{1,1}$, $v_{1,2}$, . . . , $v_{2,1}$, $v_{2,2}$, . . . ,

. . . , obtained by dimensionality reduction from the plurality of acquired learning images $S_{1,1}$, $S_{1,2}$, . . . , $S_{2,1}$, $S_{2,2}$, . . . ,

. . . , a class $C_{y(i,j)}$ among a plurality of classes $C_1$, $C_2$, . . . , $C_M$, wherein each learning image $S_{i,j}$ of the plurality of learning images and each compressed vector $v_{i,j}$ of the plurality of compressed vectors are classified into the class $C_{y(i,j)}$, and a plurality of M-dimensional score vectors $u_{i,j}$, which represent a nearness of each compressed vector $v_{i,j}$ to each of the plurality of classes;

an associator code configured to cause the one or more processors to calculate an M-dimensional representative degree vector $r_h$ that represents the degree to which each of the plurality of classes $C_1$, $C_2$, . . . , $C_M$ represents each group $G_h$ of the plurality of groups $G_1$, $G_2$, . . . , $G_L$ from one or more score vectors $u_{i,j|z(i)=h}$ calculated for one or more compressed vectors $v_{i,j|z(i)=h}$ associated with each group $G_h$, and associates each class $C_k$ of the plurality of classes with a group $G_{x(k)}$ from among the plurality of groups $G_1$, $G_2$, . . . , $G_L$ and another group $G_0$ based on the calculated representative degree vectors $r_1$, $r_2$, . . . , $r_L$;

a receiver code configured to cause the one or more processors to receive a plurality of determination images obtained by dividing a determination photograph on which a determination target is captured; and an identifier code configured to cause the one or more processors to classify each of the received plurality of determination images to one of the plurality of classes, using the learned first model, and identifies the group associated with the class into which the image is classified.

\* \* \* \* \*